(12) United States Patent
Yoshimi

(10) Patent No.: US 8,867,845 B2
(45) Date of Patent: Oct. 21, 2014

(54) PATH RECOGNITION DEVICE, VEHICLE, PATH RECOGNITION METHOD, AND PATH RECOGNITION PROGRAM

(75) Inventor: Kosuke Yoshimi, Tokyo (JP)

(73) Assignee: NEC Corporation, Tokyo (JP)

(\*) Notice: Subject to any disclaimer, the term of this patent is extended or adjusted under 35 U.S.C. 154(b) by 167 days.

(21) Appl. No.: 13/511,875

(22) PCT Filed: Nov. 25, 2010

(86) PCT No.: PCT/JP2010/070983
§ 371 (c)(1),
(2), (4) Date: May 24, 2012

(87) PCT Pub. No.: WO2011/065399
PCT Pub. Date: Jun. 3, 2011

(65) Prior Publication Data
US 2012/0288206 A1    Nov. 15, 2012

(30) Foreign Application Priority Data

Nov. 25, 2009   (JP) .................................. 2009-267421
Mar. 26, 2010   (JP) .................................. 2010-071931

(51) Int. Cl.
G06K 9/46      (2006.01)
G06K 9/62      (2006.01)
G08G 1/16      (2006.01)
G06K 9/00      (2006.01)
G06T 7/00      (2006.01)

(52) U.S. Cl.
CPC ........ *G08G 1/16* (2013.01); *G06T 2207/30256* (2013.01); *G06T 2207/30204* (2013.01); *G06K 9/6205* (2013.01); *G08G 1/167* (2013.01); *G06T 2207/20061* (2013.01); *G06T 2207/10016* (2013.01); *G06K 9/00798* (2013.01); *G06T 7/0044* (2013.01)
USPC ....................................................... 382/202

(58) Field of Classification Search
None
See application file for complete search history.

(56) References Cited

U.S. PATENT DOCUMENTS 5,555,555 A       9/1996  Sato et al.
2007/0107965 A1*  5/2007  Kakinami et al. ............ 180/167
2009/0252420 A1* 10/2009  Sakurai ......................... 382/202

FOREIGN PATENT DOCUMENTS

| JP | 6-149359 A    | 5/1994 |
| JP | 6-213660 A    | 8/1994 |
| JP | 7-302346 A    | 11/1995 |
| JP | 2003-228711 A | 8/2003 |
| JP | 2004-252827 A | 9/2004 |
| JP | 2006-260358 A | 9/2006 |
| JP | 2006-309499 A | 11/2006 |
| JP | 2007-141167 A | 6/2007 |
| JP | 2007-293892 A | 11/2007 |
| JP | 2007-299414 A | 11/2007 |

\* cited by examiner

*Primary Examiner* — Stephen R Koziol
*Assistant Examiner* — Amandeep Saini
(74) *Attorney, Agent, or Firm* — Sughrue Mion, PLLC

(57) ABSTRACT

The recognition of a lane boundary line expressed by a stud-shaped lane mark is realized with high accuracy against noise and with a small calculation amount and a small memory consumption amount.

A lane recognition device extracts a candidate position of a lane mark from a received input image. A vote value is weighted according to the elapsed time with regard to the extracted candidate position of the lane mark to cumulatively perform voting to a parameter space of an approximate curved line or an approximate straight line, and, thus, to generate a time-series cumulative voting feature image. A candidate of a lane boundary line position is extracted based on the generated time-series cumulative voting feature image to determine the lane boundary line position. The lane recognition device may be provided with an image output device which images an image and outputs the imaged image.

16 Claims, 21 Drawing Sheets

PATH RECOGNITION DEVICE, VEHICLE, PATH RECOGNITION METHOD, AND PATH RECOGNITION PROGRAM

CROSS REFERENCE TO RELATED APPLICATIONS

This application is a National Stage of International Application No. PCT/JP2010/070983 filed Nov. 25, 2010, claiming priority based on Japanese Patent Application Nos. 2009-267421 filed Nov. 25, 2009 and 2010-071931 filed Mar. 26, 2010, the contents of all of which are incorporated herein by reference in their entirety.

TECHNICAL FIELD

The present invention relates to recognition of a lane (path) boundary represented by a stud-shaped lane mark provided on a road surface.

BACKGROUND ART

There has been known a lane recognition device which recognizes a lane mark representing a traffic lane boundary provided on a mad surface using visual sensor information mounted in a vehicle and recognizes a relative positional relationship between an own vehicle and a lane.

As one of the lane marks representing the traffic lane boundary, there is a "linear lane mark" such as a continuous line and a dashed line painted in white, yellow, or the like in color on a mad surface.

In addition to the linear lane mark, there is a "stud-shaped (type) lane mark" in which reflective elements and so on are buried along a lane boundary. The stud-shaped lane mark is called a point sequential lane mark, a cat's eye, a botts dot, a road stud, and so on. The botts dot (also referred to as Bott' dot(s) or Bott dot(s)) is a kind of the stud-shaped lane mark used especially in California, United States of American. In the present specification and the present invention, the "stud-shaped lane mark" is a general term including the above exemplified lane marks, and the "stud shape" does not limit specific shapes.

As an example of such a lane mark recognition device, Patent Document 1 discloses a lane recognition apparatus especially for the linear lane mark.

The lane recognition apparatus disclosed in the Patent Document 1 includes an image input device, an edge emphasizing device, a straight line extraction processing device, a white line determination processing device, and a white line output device. The lane recognition apparatus selects a feature point of a pixel with a large brightness change in an image of a lane surface obtained by imaging means to extract an approximate straight line by Hough conversion, and, thus, to determine this straight line as an edge of a white line. Further, the lane recognition apparatus is operated to search, from a final pixel near the straight line as a starting point, pixels in an image direction far away from a vehicle and determine the pixels as the white line edge.

Meanwhile, in the stud-shaped lane mark, the number of edge features obtainable is extremely small in comparison with the liner lane mark. Thus, the stud-shaped lane mark cannot be recognized well with the above-mentioned method. Thus, as a general method, an estimated position of the stud-shaped lane mark is detected using a filter which returns a value only to features similar to those of the stud-shaped lane mark in an image, and a lane boundary line is recognized based on information of the estimated position.

For example, in the technique disclosed in Patent Document 2, a previously obtained image of the stud-shaped lane mark as a feature extraction filter is used as a template, and a template matching method in which a region having a similar feature is extracted from an image taken by a camera mounted in a vehicle is used. Further, in the technique disclosed in the Patent Document 2, in order to compensate for a deficiency in candidate regions, there has been proposed a method of detecting the stud-shaped lane mark using an image obtained by composing a first image and a second image obtained when a vehicle travels from the position of the first image by a distance of one-half an installation interval of the lane mark.

Patent Document 3 proposes a method of creating a smooth image obtained by composing time-series feature images, making a stud-shaped lane mark linear on the composed image, detecting a feature using an edge gradient and so on as in a linear lane mark, and detecting a straight line using Hough conversion on a feature coordinate, and thereby recognizing a traffic lane position.

CITATION LIST

Patent Literature

{PTL 1} JP-A-7-302346
{PTL 2} JP-A-2006-309499
{PTL 3} JP-A-2006-260358

SUMMARY OF INVENTION

Technical Problem

As described above, in the lane recognition device disclosed in the Patent Document 1, the stud-shaped lane mark cannot be recognized well.

In the technique disclosed in the Patent Document 2, the method of matching to the template image to detect the stud-shaped lane mark, there is a disadvantage that a detection performance is significantly deteriorated by noise, contamination of the real lane marks, and a trivial change of the shape of the lane mark. Further, since there are several types of the stud-shaped lane marks, template images corresponding to all the types are required to be provided, and accompanying this, the calculation amount is increased and the memory consumption amount is also increased. Especially, in a square cross-sectional stud-shaped lane mark, since the apparent shape is changed by a positional relationship between the installation position and a camera, the method of detecting the stud-shaped lane mark by matching to the template image is difficult in reality. When a common template image with an opaque resolution is used, a trivial change can be absorbed; however, a region which is not the stud-shaped lane mark is also detected as noise. For such a case, the Patent Document 2 does not disclose a method at all of identifying noise and the stud-shaped lane mark. In order to enhance detection possibility, the Patent Document 2 proposes that time-series images shifted in the direction of travel by one constant of the installation interval of the stud-shaped lane marks are composed to obtain one composed image, and thereafter, the stud-shaped lane mark is detected by the above method. However, since the method of identifying noise and the stud-shaped lane mark is not disclosed, the above disadvantage is not solved.

In the technique disclosed in the Patent Document 3, many past time-series input images (or feature images) are required to be stored and composed, and a large calculation amount and a large memory amount are required. To make the stud-shaped lane mark linear on the composed image, an image change amount should be small between image frames used for composition. Thus, when the moving speed of a vehicle increases, a camera with a higher frame rate is required in order to keep a small image change amount between the single frames. Thus, when a vehicle moves at high speed, the stud-shaped lane mark on the composed image is sparse, and the stud-shaped lane mark may not be composed linearly well.

When the traveling direction of a vehicle is not parallel to a lane, an image of the stud-shaped lane mark is varied in a horizontal direction on the composed image, and the stud-shaped lane mark may not be composed linearly well after all.

Thus, an exemplary object of the present invention is to provide a lane recognition device, a lane recognition method, and a lane recognition program that can realize the recognition of a lane boundary line, expressed by a stud-shaped lane mark, with high accuracy against noise and with a small calculation amount and a small memory consumption amount.

Solution to Problem

According to a first exemplary aspect of the present invention, there is provided a lane recognition device including: a feature extraction unit which extracts a candidate position of a lane mark from a received input image; a cumulative voting unit which weights a vote value according to the elapsed time with regard to the extracted candidate position to cumulatively perform voting to a parameter space of an approximate curved line or an approximate straight line, and, thus, to generate a cumulative voting feature image; and a lane boundary discrimination unit which extracts a candidate of a lane boundary line position based on the generated cumulative voting feature image to determine the lane boundary line position.

According to a second exemplary aspect of the present invention, there is provided a vehicle including the lane recognition device, wherein the lane recognition device includes an image output device which images an image and outputs the imaged image, and the input image received by the feature extraction unit is the image output from the image output device.

According to a third exemplary aspect of the present invention, there is provided a lane recognition method including: extracting a candidate position of a lane mark from a received input image; weighting a vote value according to the elapsed time with regard to the extracted candidate position to cumulatively perform voting to a parameter space of an approximate curved line or an approximate straight line, and, thus, to generate a cumulative voting feature image, and extracting a candidate of a lane boundary line position based on the generated cumulative voting feature image to determine the lane boundary line position.

According to a fourth exemplary aspect of the present invention, there is provided a lane recognition program causing a computer to realize a feature extraction function that extracts a candidate position of a lane mark from a received input image, a cumulative voting function that weights a vote value according to the elapsed time with regard to the extracted candidate position to cumulatively perform voting to a parameter space of an approximate curved line or an approximate straight line, and, thus, to generate a cumulative voting feature image and a lane boundary determination function that extracts a candidate of a lane boundary line position based on the generated cumulative voting feature image to determine the lane boundary line position.

Advantageous Effects of Invention

According to the present invention, estimated positions of lane marks discretely provided are extracted as feature points from time-series input images according to a feature image, and a straight line (or a curved line) drawn in a time-series manner by the feature points being extracted, so that a lane boundary line can be recognized with high accuracy against noise.

Further, according to the present invention, since information amount used in calculation is reduced, the lane boundary line can be recognized with a small calculation amount and a small memory consumption amount.

DESCRIPTION OF EMBODIMENTS

Next, exemplary embodiments of the present invention will be described in detail using the drawings.

First Embodiment

Figure 1:
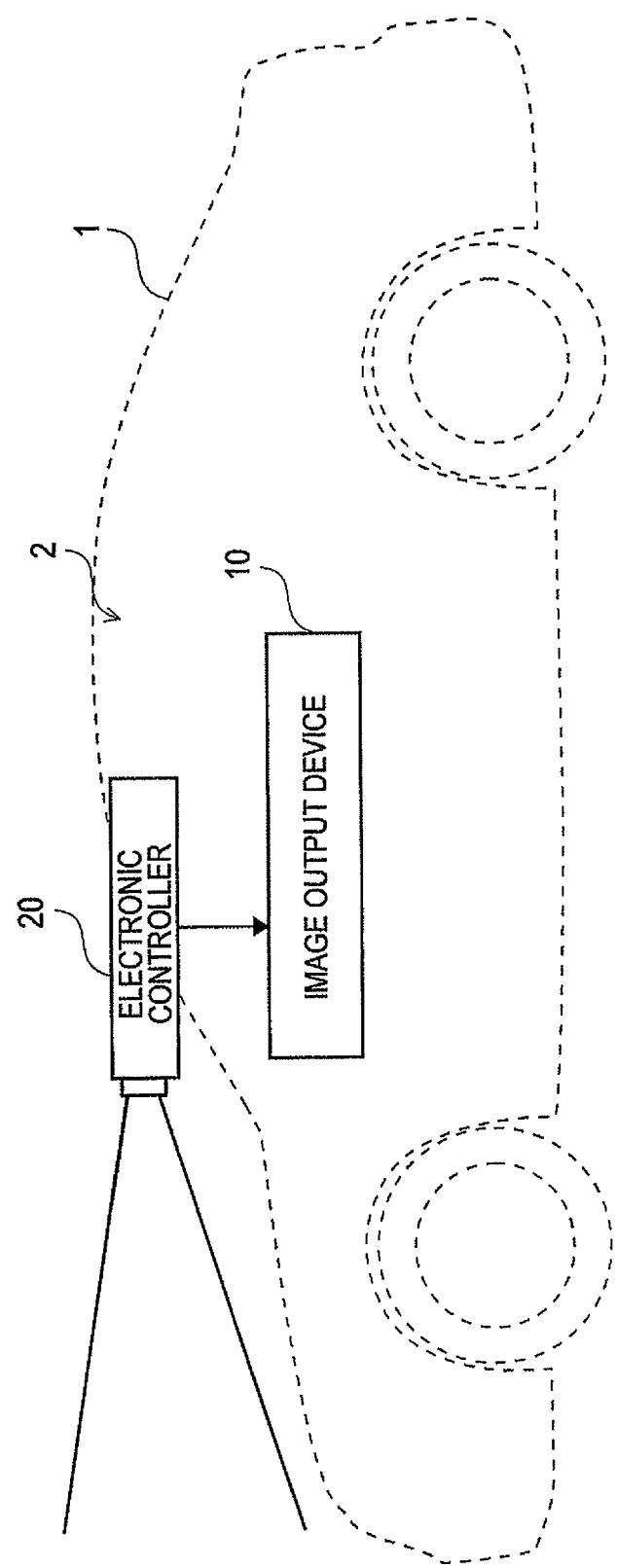
FIG. 1 A block diagram schematically shows a configuration of a vehicle including a lane recognition device according to a first embodiment of the present invention.

FIG. 1 is a block diagram schematically showing a configuration of a vehicle including a lane recognition device 2 as a first embodiment of the present invention.

In FIG. 1, although a car is illustrated as an object in which the lane recognition device 2 is mounted, it is just an example. In addition to the vehicle, the lane recognition device 2 may be mounted in a carrier, a mobile robot, and so on traveling in a factory, a motorcycle, and so on. A "vehicle" in the present specification and the present invention includes those objects.

Referring to FIG. 1, the lane recognition device 2 is mounted in the vehicle 1. The lane recognition device 2 has an electronic controller 10 and an image output device 20.

Although the illustration is omitted in FIG. 1, a lane mark is an object to be recognized in the present embodiment. The lane mark is a mark showing a traffic lane boundary provided on a mad surface. The lane mark includes a "linear lane mark" such as a continuous line and a dashed line painted in white, yellow, or the like in color on a road surface and a "stud-shaped lane mark" which is provided on a road surface, is a space (solid) structure, and is provided according to a discrete pattern along a lane boundary. An example of a cross-sectional shape of the stud-shaped lane mark as a space structure includes an elliptical shape, a square shape, a rectangle shape, and a trapezoidal shape.

A specific example of the stud-shaped lane mark includes a literature that defines the lane mark used in California, in the United States of America (edited by John Gizinos, Sant Wong, "STANDARD PLANS" State of California, Business, Transportation and Housing Agency, Department of Transportation, 2006, p. 5 (A20A)).

The stud-shaped (type) lane mark is called a point sequential lane mark (road stud, raised pavement marker), a botts dot (Bott's dot(s), Bott' dot(s), Bott dot(s), Botts dot(s), Botts' dot(s)), a cat's eye, and so on. As described in the Background Art, in the present specification and the present invention, the "stud-shaped lane mark" is a general term including the above exemplified lane marks, and the "stud shape" does not limit specific shapes. In the following description, the stud-shaped lane mark will be simply described as a lane mark. When the stud-shaped lane mark is simply referred to as a lane mark, it means either a linear lane mark or a stud-shaped lane mark or other lane marks.

The image output device 20 is a device which outputs at least image information to the electronic controller 10. In FIG. 1, the image output device 20 is illustrated as an imaging device.

The imaging device is a device which images an image in real time and is mounted in a vehicle 1 so as to image a vehicle traveling lane. As the imaging device, a video camera which outputs a National Television Standards Committee (NTSC) format may be used, for example. Any image format other than the NTSC format may be used.

As the image output device 20, not only the imaging device but also an image capture device which reads out image information stored in a storage medium and converts the image information into an NTSC output may be used.

The electronic controller 10 is an information processing device which performs information processing for recognizing a lane.

Figure 2:
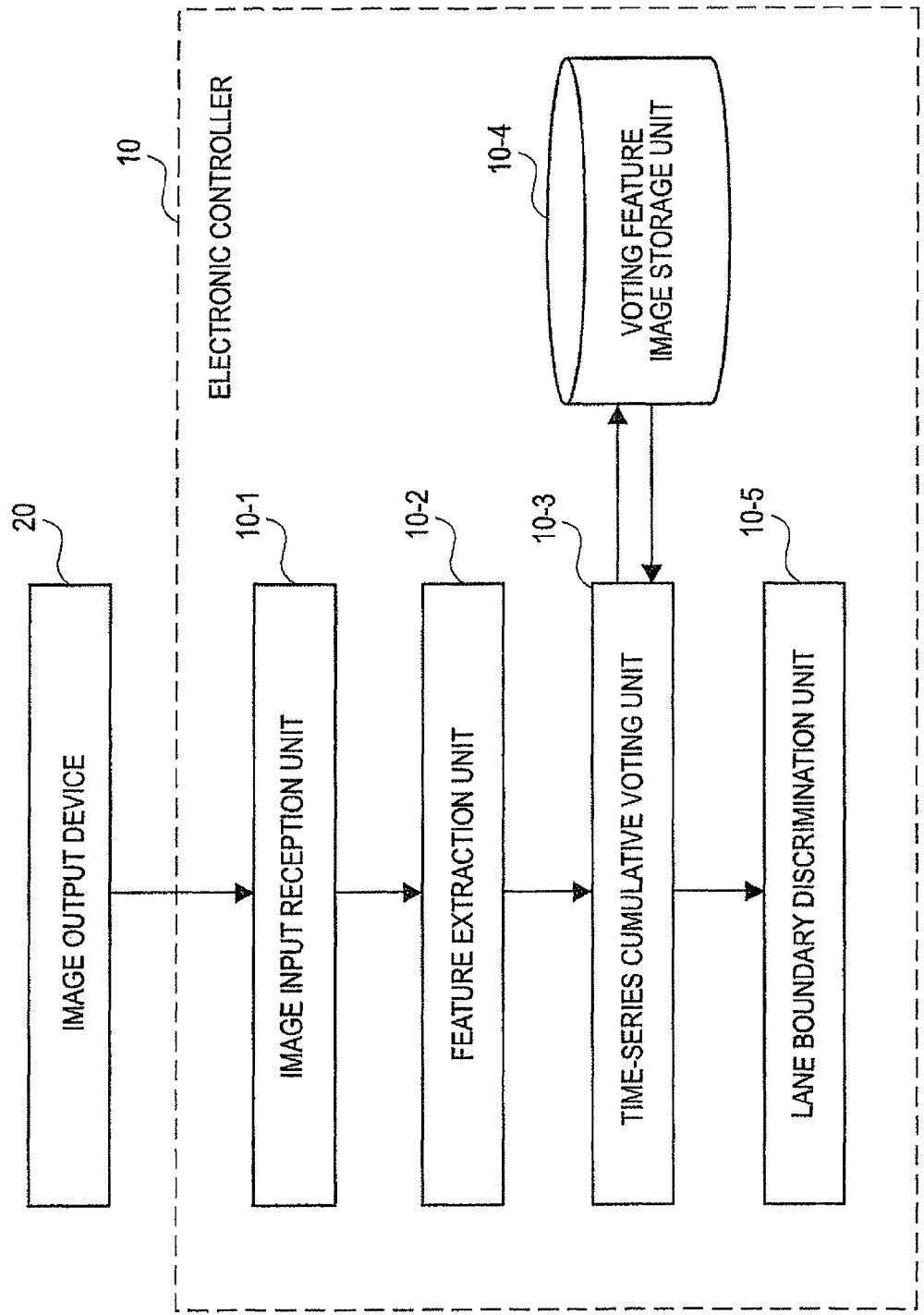
FIG. 2 A block diagram schematically shows a configuration of the lane recognition device according to the first embodiment of the present invention.

FIG. 2 is a block diagram schematically showing a configuration of the lane recognition device according to the first embodiment of the present invention.

Each unit realized in the electronic controller 10 is realized as an individual device, a portion of a device, or an electronic circuit by hardware.

Referring to FIG. 2, the electronic controller 10 according to the first embodiment of the present invention has an image input reception unit 10-1, a feature extraction unit 10-2, a time-series cumulative voting unit 10-3, a voting feature image storage unit 10-4, and a lane boundary discrimination unit 10-5.

Those units operate roughly as follows, respectively.

The image input reception unit 10-1 obtains an image from the image output device 20. When obtaining the image, the image input reception unit 10-1 may control the format of the obtained image such as cutting out a necessary image region, adjusting resolution and size, and extracting an odd (or even) field from an NTSC format image.

The feature extraction unit 10-2 applies such filtering processing that integer values or real values are output for each coordinate at each position of the image, obtained by the image input reception unit 10-1, according to a probability that a lane mark exists, using surrounding pixels as an input. As a filter used in this processing, there may be used any filter such as a pattern correlation filter according to a previously obtained template image and a circular filter which calculates a difference and a ratio of a statistic of brightness between a central region and a peripheral region.

The time-series cumulative voting unit 10-3 extracts a feature point as a candidate of a lane mark position from a feature image generated by the feature extraction unit 10-2 to weight the feature point for each elapsed time, and, thus, to cumulatively vote to a parameter space of an approximate curve or an approximate straight line. By virtue of the cumulative voting in which weighting is performed for each elapsed time, a cumulative voting feature image including vote values of the plurality of times in the past is generated.

In the extraction of the feature point, each pixel on the feature image appropriately subjected to threshold processing may be selected, a pixel having a maximum value may be selected from a small region which is an aggregate of adjacent pixels having a value not less than a threshold value, or the center of gravity in the small region may be selected. In the calculation of the vote value, Hough conversion (PVC. Hough, "Method and Means for Recognising Complex Patterns," U.S. Pat. No. 3,069,654, 1962) and generalized Hough conversion as an extended version of Hough conversion may be used.

When Hough conversion is used, a vote value to a parameter space ($\rho$, $\theta$) of an approximate straight line (defined as $\rho = x \cos\theta + y \sin\theta$, for example) is calculated from an image coordinate (x, y) of the feature point, and the parameter space ($\rho$, $\theta$) where extracted all the vote values of the feature points are added constitutes a voting feature image. The vote value thus calculated may be weighted according to a magnitude of an output in the feature extraction of each feature point.

In the time-series cumulative voting unit 10-3, a voting feature image generated at past time is read from the voting feature image storage unit 10-4, a vote value at the present time (represented by t) is added and voted to a voting feature image generated from features for the past certain period of time to generate the cumulative voting feature images cumulated in a time-series manner.

Figure 5:
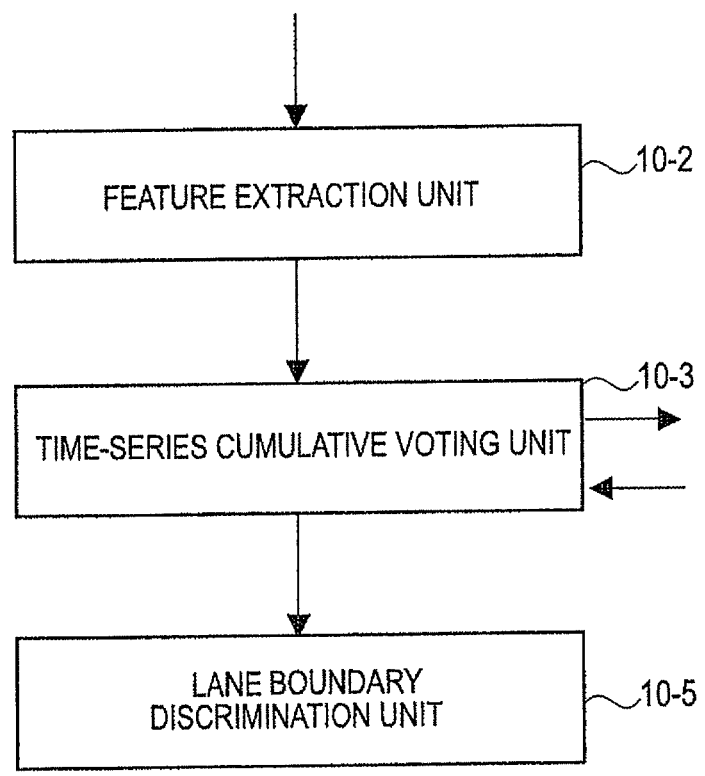
FIG. 5 A block diagram schematically shows a configuration essential for the lane recognition device according to the first embodiment of the present invention.

The electronic controller 10 may not have the image input reception unit 10-1 and the voting feature image storage unit 10-4. Namely, an image to be recognized may be input from an external image input reception unit. Alternatively, an external voting feature image storage unit stores a voting feature image generated at the past time, and the voting feature image may be read from the external voting feature image storage unit. Accordingly, as shown in FIG. 5, the electronic controller 10 of the present embodiment may be constituted of the feature extraction unit 10-2, the time-series cumulative voting unit 10-3, and the lane boundary discrimination unit 10-5.

Figure 6:
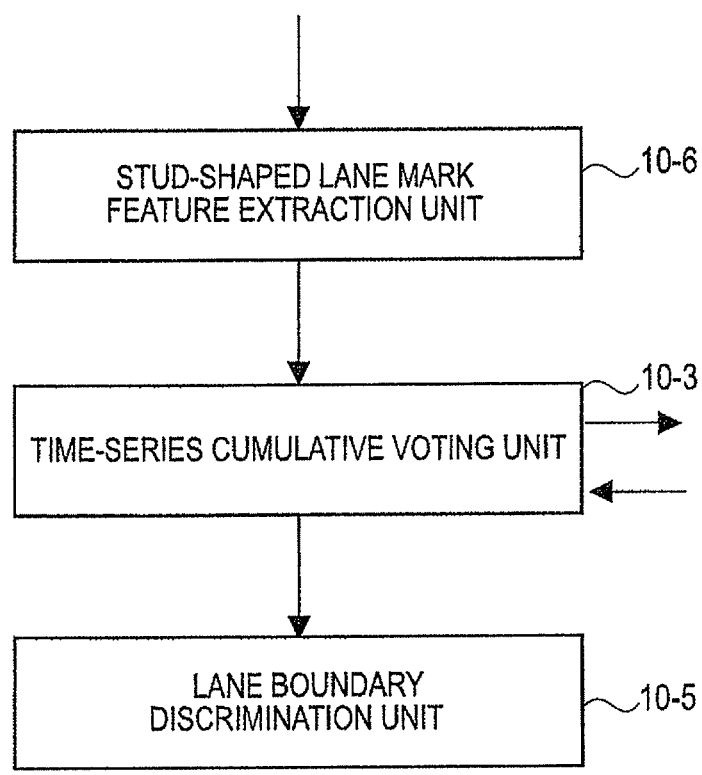
FIG. 6 A block diagram schematically shows a configuration essential for the lane recognition device according to the first embodiment of the present invention when a stud-shaped lane mark is an object to be recognized.
Figure 7:
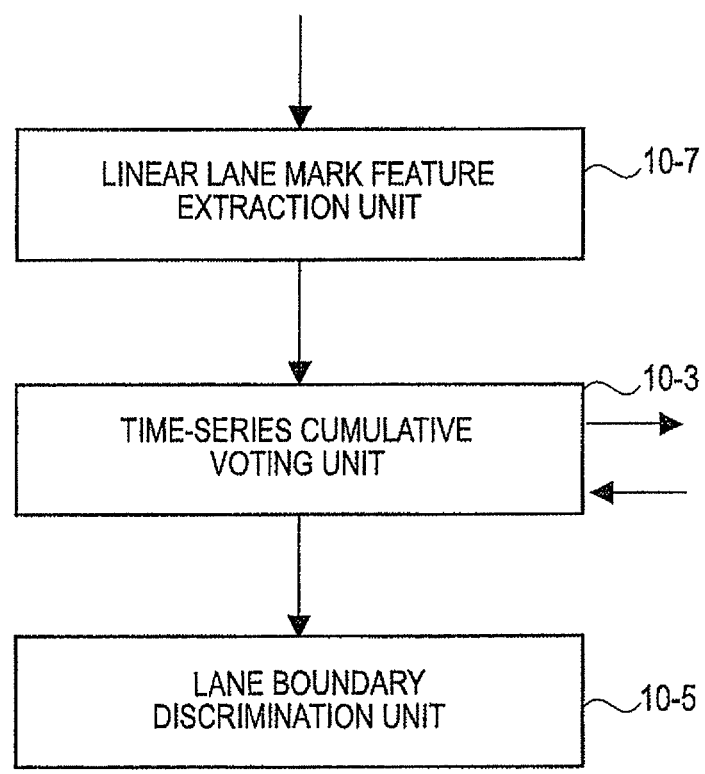
FIG. 7 A block diagram schematically shows a configuration essential for the lane recognition device according to the first embodiment of the present invention when the linear lane mark is the object to be classified.

In the above description, although the lane mark is the object to be recognized, the lane mark to be recognized may be the stud-shaped lane mark or the linear lane mark. FIG. 6 is a block diagram of an electronic controller when the lane mark to be recognized is the stud-shaped lane mark, and FIG. 7 is a block diagram of the electronic controller when the lane mark to be recognized is the linear lane mark. In FIG. 6, the feature extraction unit 10-2 of FIG. 5 is replaced with a stud-shaped lane mark feature extraction unit 10-6 which performs feature extraction of the stud-shaped lane mark. In FIG. 7, the feature extraction unit 10-2 of FIG. 5 is replaced with a linear lane mark feature extraction unit 10-7 which performs feature extraction of the linear lane mark.

As specific examples of the time-series cumulative voting unit 10-3, the following two examples (first embodiment: example 1) and (first embodiment: example 2) are shown.

First Embodiment

Example 1

As a first specific example of the first embodiment, all voting feature images generated by only a feature point extracted at each past time from time (t−T) to time (t−1) are stored, and the cumulative voting feature image may be generated from the voting feature image at time (t) and a time-series vote value for T hours from the time (t−T) to the time (t). At this time, when the vote value calculated at a certain time (t) is f($\rho$, $\theta$, t), a cumulative vote value s($\rho$, $\theta$, t) which is generated when the weight to the vote value at each time is $\alpha i$ (i=0, 1, . . . , and T) and is an output on the cumulative voting feature image can be calculated by the following formula (1):

Equation 1

$$s(\rho,\theta,t) = \alpha 0 * f(\rho,\theta,t) + \alpha 1 * f(\rho,\theta,t-1) + \alpha 2 * f(\rho,\Theta,t-2) + \ldots + \alpha T * f(\rho,\theta,t-T) \quad (1)$$

where "*" means multiplication. The weight $\alpha i$ is a coefficient representing a contribution in the cumulative voting feature image of the voting feature image at each time and can be defined as follows as such a forgetting coefficient that is reduced according to the elapsed time:

[Equation 2]

$$\alpha_i = \left(\frac{1}{k^i}\right) \bigg/ \left[\sum_{i=0}^{T}\left(\frac{1}{k^i}\right)\right] \quad (2)$$

where k is a decimal not less than 1.0, and the weight $\alpha i$ is one k-th each time the index i is increased by 1. Normalization is performed so that the total of the coefficients from i=0 to T becomes 1.

After the generation of the cumulative voting feature image, the voting feature image at the time (t) is stored in the voting feature image storage unit 10-4.

The voting feature images before the time (t−T) may be stored or deleted.

In the above case, although a period of time when the past voting values are cumulated and the weight to the vote values at the individual times can be controlled, the amount of data to be stored and the calculation amount increase in comparison with the following method using a forgetting coefficient in (first embodiment: example 2), and therefore, a memory and the calculation time are consumed. The cumulative voting feature image to be stored may be an array (x, y, z; t) of the feature points at each time before the calculation of the vote value (x, y: a coordinate of the feature point in an input image, z: output in the feature extraction, and t: time). The cumulative voting feature image may not the array (x, y, z; t) of the feature points at each time and may be the cumulative voting feature image in which the vote value is arranged on the voting feature image ($\rho$, $\theta$) or array information of only a voting feature point ($\rho$, $\theta$, f; t) constituted of a voting feature image coordinate and the vote value. In either case, data size can be reduced more than when the feature image itself extracted by the feature extraction unit is stored.

This is because in comparison with a case where an input image (or a feature image) at each time in a time-series section is stored, when only the coordinate of the feature point output as an estimated position of the lane mark and an output are stored as the array, information of other coordinates can be truncated, so that the amount of information to be stored can be reduced. Although the voting feature image is a space constituted of a parameter of an approximate straight line (or an approximate curved line) passing through the feature point, the domain can be compressed to the amount of information smaller than the input image (or the feature image) by previously setting a range that can be taken as a relative position between a lane boundary line and a vehicle.

For the reason described above, the data size held by the array information of only the voting feature point $(\rho, \theta, f; t)$ is small in comparison with the voting feature image.

First Embodiment

Example 2

As a second specific example of the first embodiment, there may be used the following method of generating a time-series cumulative voting feature image while weighting using a forgetting coefficient.

A cumulative voting feature image generated at the previous time (represented by t−1) is read out, and weighting using a forgetting coefficient ($\alpha$, $0 \leq \alpha \leq 1$) is applied to all values in the voting feature image. Further, with regard to each feature point extracted at the present time (represented by t), the vote value to the parameter space ($\rho, \theta$) is calculated. This vote value is added and voted to the read voting feature image, and the generated cumulative voting feature image at the time (t) is stored.

At that time, when a vote value calculated at a certain time (t) to a certain coordinate ($\rho, \theta$) on the voting feature image is $f(\rho, \theta, t)$, a cumulative vote value $s(\rho, \theta, t)$ that is an output on a generated cumulative voting feature image can be calculated by the following formula, using a forgetting coefficient $\alpha(0 \leq \alpha \leq 1)$:

[Equation 3]

$$s(\rho,\theta,t)=f(\rho,\theta,t)+\alpha s(\rho,\theta,t-1) \qquad (3)$$

In the above Equation (3), the effects similar to those in the case where the weight $\alpha i$ (i=0, 1, ..., and T) to the vote value at each time in the Equation (1) is $\alpha i = \alpha i^{}i$ are obtained ("" represents multiplication, and "$\alpha i^{**}i$" represents "the i-th power of $\alpha$").

In the above case, data stored in the voting feature image storage unit 10-4 may be only one cumulative voting feature image in which weighted time-series vote values updated at every time are cumulated, whereby the size of data to be stored can be significantly reduced in comparison with a case of storing an input image (or a feature image) at each time in the time-series section as in the other common technique (for example, the technique disclosed in the Patent Document 3).

Also in the method of holding the feature for the past certain period of time as in (first embodiment: example 1), as described above, the memory to be occupied is reduced in comparison with the above case of storing the input image (or the feature image) at each time in the time-series section; however, according to the method in (first embodiment 1: example 2), the size of data to be stored can be further reduced.

The calculation amount is reduced more than when the weighted sum is calculated as in (first embodiment 1: example 1).

The stored cumulative voting feature image may be a cumulative voting feature image in which the vote values are arranged on the voting feature image ($\rho, \theta$) or the array information of only the voting feature point ($\rho, \theta, f; t$) constituted of the voting feature image coordinate and the vote value. The data size held by the latter can be reduced more than that held by the former.

The voting feature image storage unit 10-4 stores the cumulative voting feature image generated in the time-series cumulative voting feature unit 10-3 and provides the cumulative voting feature image to the time-series cumulative voting unit 10-3 in the next cycle.

The lane boundary discrimination unit 10-5 discriminates the presence of the lane boundary and the position based on the vote value of the output of the time-series cumulative voting unit 10-3. In the discrimination method, a position where an output of the cumulative voting feature image is not less than a threshold value can be discriminated as a candidate of a lane boundary line position. Meanwhile, when there is no candidate with not less than the threshold value, such a result that the lane boundary line cannot be determined can be output.

A range that can exist as a relative position between the lane boundary line and an own vehicle is set, and only candidates of the lane boundary line position within this range are selected to be narrowed down. An evaluated value showing a probability as the lane boundary line position is set to each candidate, and as the value of the output of the cumulative voting feature image becomes higher, the evaluated value is set to be further raised. The candidate with the high evaluated value can be determined as the lane boundary line position.

The evaluated value can be changed by the positional relationship with the past lane boundary line position. For example, the evaluated value weighted by a distance from the past lane boundary line position can be set so that the evaluated value of the candidate closer to a temporally close past lane boundary line position is raised.

A pair of left and right candidates with a high evaluated value can be determined as a candidate showing left and right lane boundary lines. At this time, a distance between the left and right lane boundary lines and a range of a distance that can be taken as a previously set lane width are compared, and even if a candidate has a high order evaluated value, when a pair of the left and right lane boundary line candidates is not within this range, the pair can be prevented from being selected.

Figure 3:
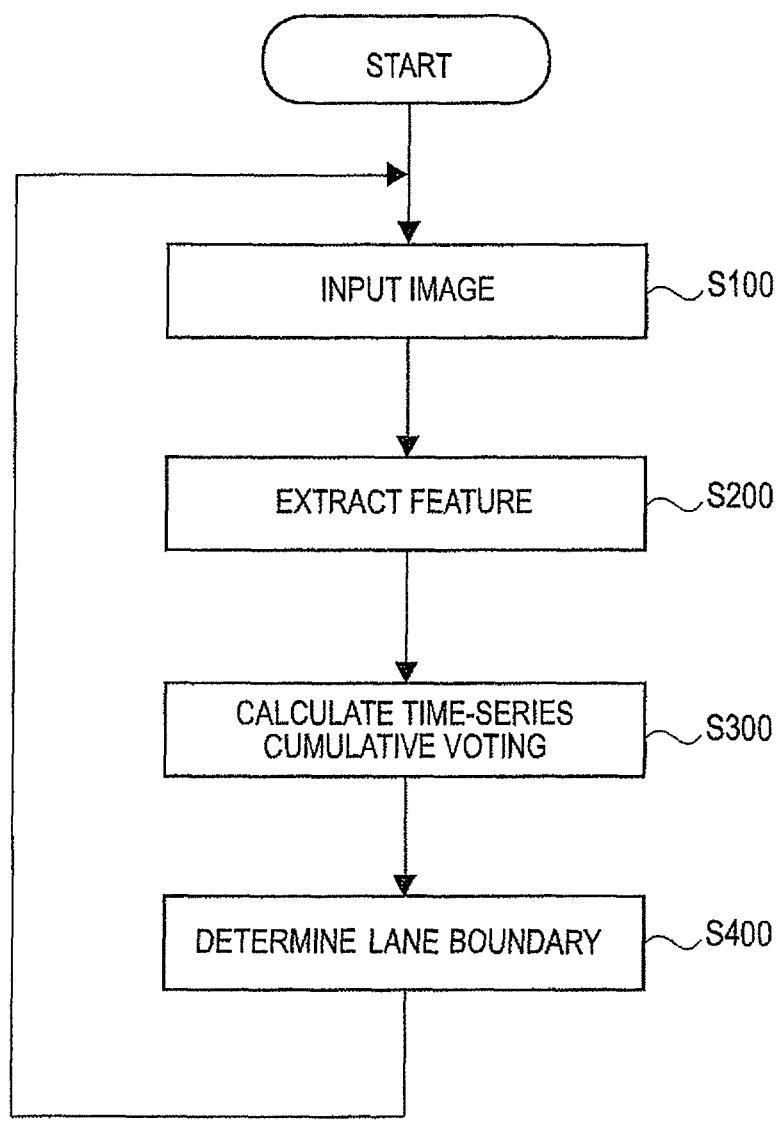
FIG. 3 A flow chart schematically shows operation of an electronic controller in the lane recognition device according to the first embodiment of the present invention.
Figure 4:
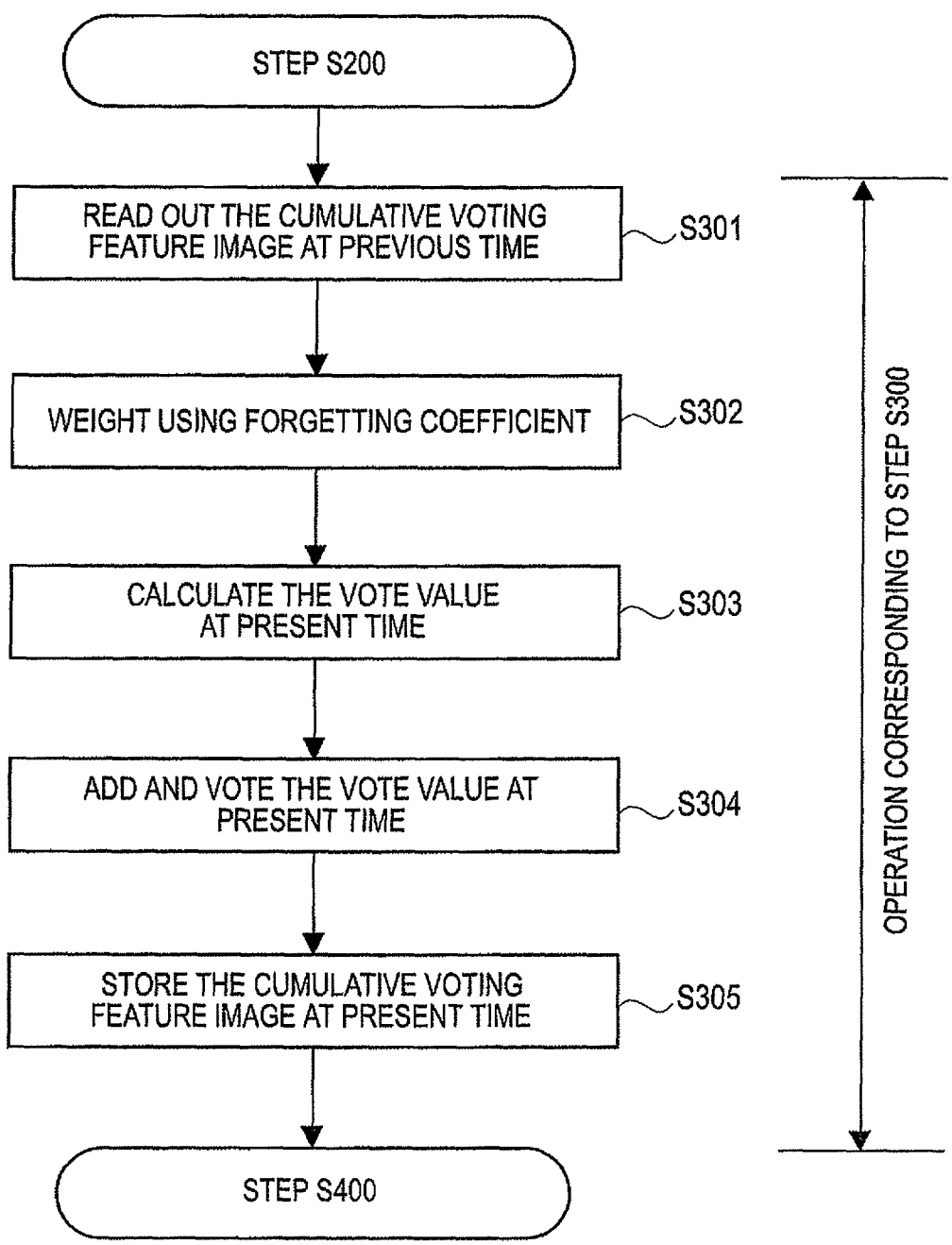
FIG. 4 A flow chart schematically shows a specific example of operation of a step of time-series cumulative voting calculation of operation of the electronic controller in the lane recognition device according to the first embodiment of the present invention.

Next, operation of the present embodiment will be described with reference to FIGS. 3 and 4. FIG. 3 is a flowchart schematically showing the operation of the electronic controller 10 in the lane recognition device 2 according to the first embodiment of the present invention. The operation shown in FIGS. 3 and 4 is just one specific example. In the present embodiment, various operations and calculation methods are employed as described above, and operation in a case where the specific examples shown in FIGS. 3 and 4 are modified can be realized.

Referring to FIG. 3, first of all, the image input reception unit 10-1 of the electronic controller 10 obtains an image as an object to be recognized from the image output device 20 (step S100).

Next, the feature extraction unit 10-2 applies filter processing, in which a reaction value is output according to the probability of the presence of the lane mark, at each position of obtained images, whereby feature extraction (creation of an image) is performed (step S200).

Subsequently, the time-series cumulative voting unit 10-3 extracts the feature points from a feature extraction image and calculates the vote value to the voting feature image from each feature point. Then, the time-series cumulative voting unit 10-3 adds and votes the vote value at the present time to the voting feature image in which the weighed vote values from the past cycle stored in the voting feature image storage unit 10-4 are cumulated to generate the time-series cumulative voting feature image (step S300).

Further, the lane boundary discrimination unit 10-5 determines the presence of the lane boundary line, the position, and so on based on the vote value in the time-series cumulative voting feature image (step S400).

Next, the operation of the present embodiment will be described in detail with reference to FIG. 4.

FIG. 4 is a flowchart schematically showing operation of a specific example of the time-series cumulative voting calculation (step S300 in FIG. 3) of the operation of the electronic controller 10 in the lane recognition device according to the first embodiment of the present invention.

Referring to FIG. 4, as an example, in the time-series cumulative voting calculation (step S300 in FIG. 3), first of all, the time-series cumulative voting unit 10-3 reads out the cumulative voting feature image generated at the previous time (represented by t−1) from the voting feature image storage unit 10-4 (step S301).

Next, the time-series cumulative voting unit 10-3 weights all the values in the voting feature image, using the forgetting coefficient ($\alpha$, $0 \leq \alpha \leq 1$) (step S302).

Subsequently, the time-series cumulative voting unit 10-3 calculates the vote value to the parameter space ($\rho$, $\theta$) for each feature point extracted at the present time (represented by t) (step S303).

Further, the time-series cumulative voting unit 10-3 adds and votes the calculated vote value at the time (t) to the read-out voting feature image (step S304).

Next, the time-series cumulative voting unit 10-3 stores the generated cumulative voting feature image at the time (t) in the voting feature image storage unit 10-4 (step S305).

By virtue of the above operation, the time-series cumulative voting calculation (step S300 in FIG. 3) is realized.

Figure 8:
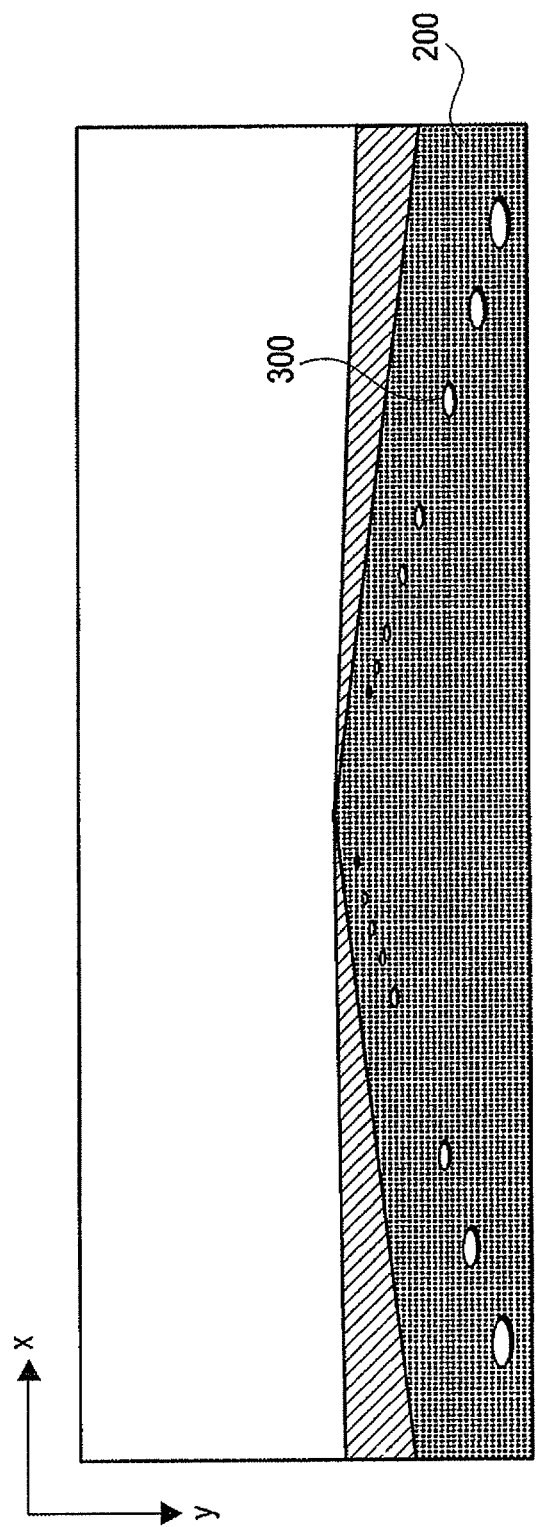
FIG. 8 A view schematically shows an example of an input image input in the lane recognition device according to the first embodiment of the present invention.
Figure 9:
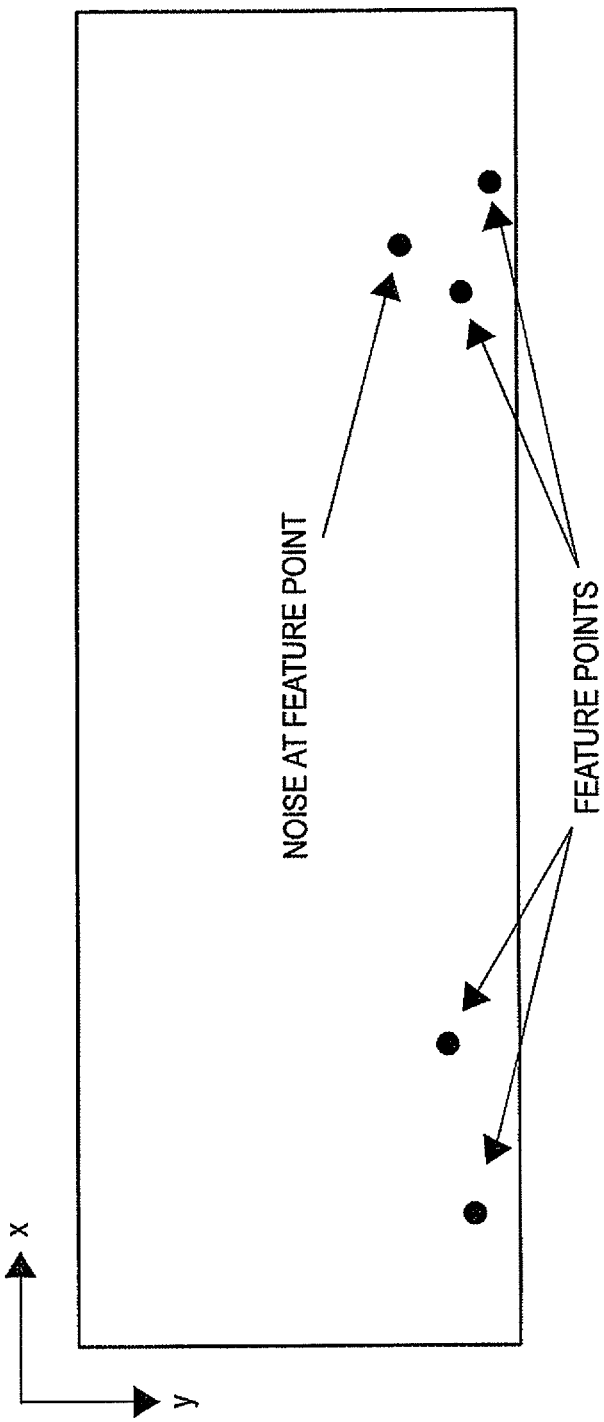
FIG. 9 A view schematically shows an example of a feature image generated by a feature extraction function in the lane recognition device according to the first embodiment of the present invention.
Figure 10:
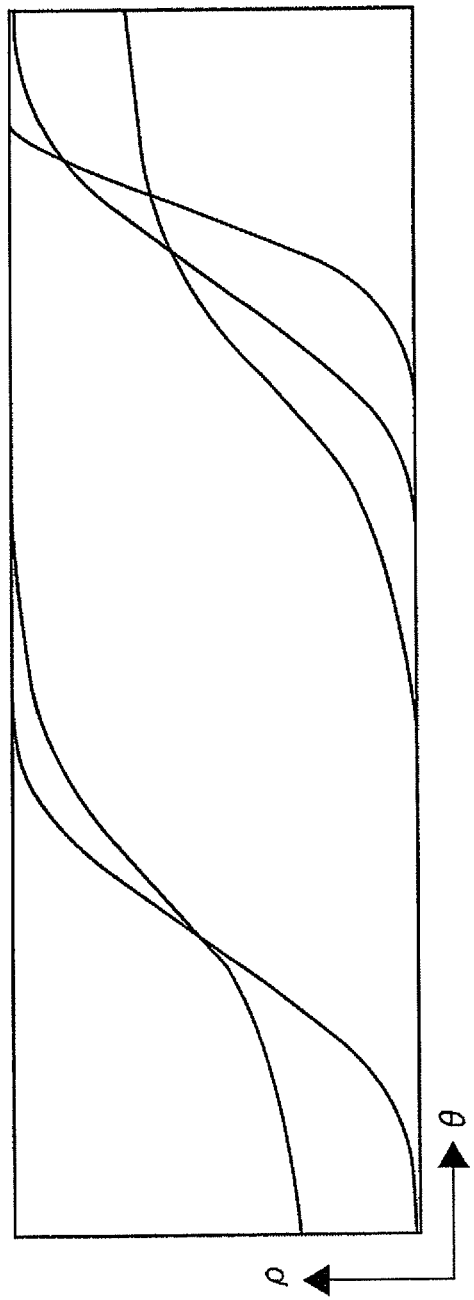
FIG. 10 A view schematically shows an example of a voting feature image generated by a time-series cumulative voting function in the lane recognition device according to the first embodiment of the present invention.
Figure 11:
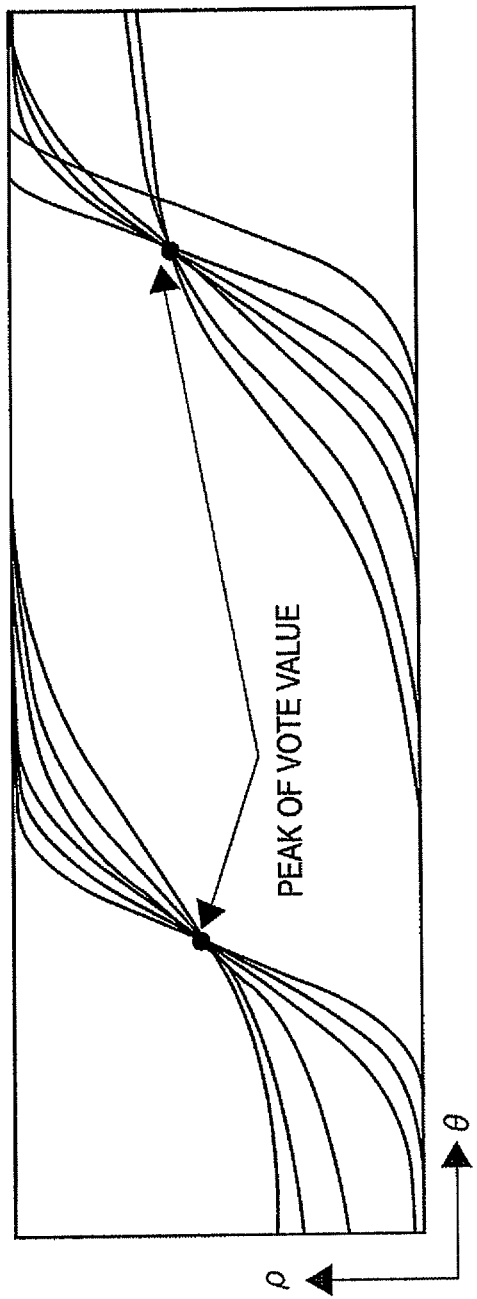
FIG. 11 A view schematically shows an example of a time-series cumulative voting feature image generated by the time-series cumulative voting function in the lane recognition device according to the first embodiment of the present invention.
Figure 12:
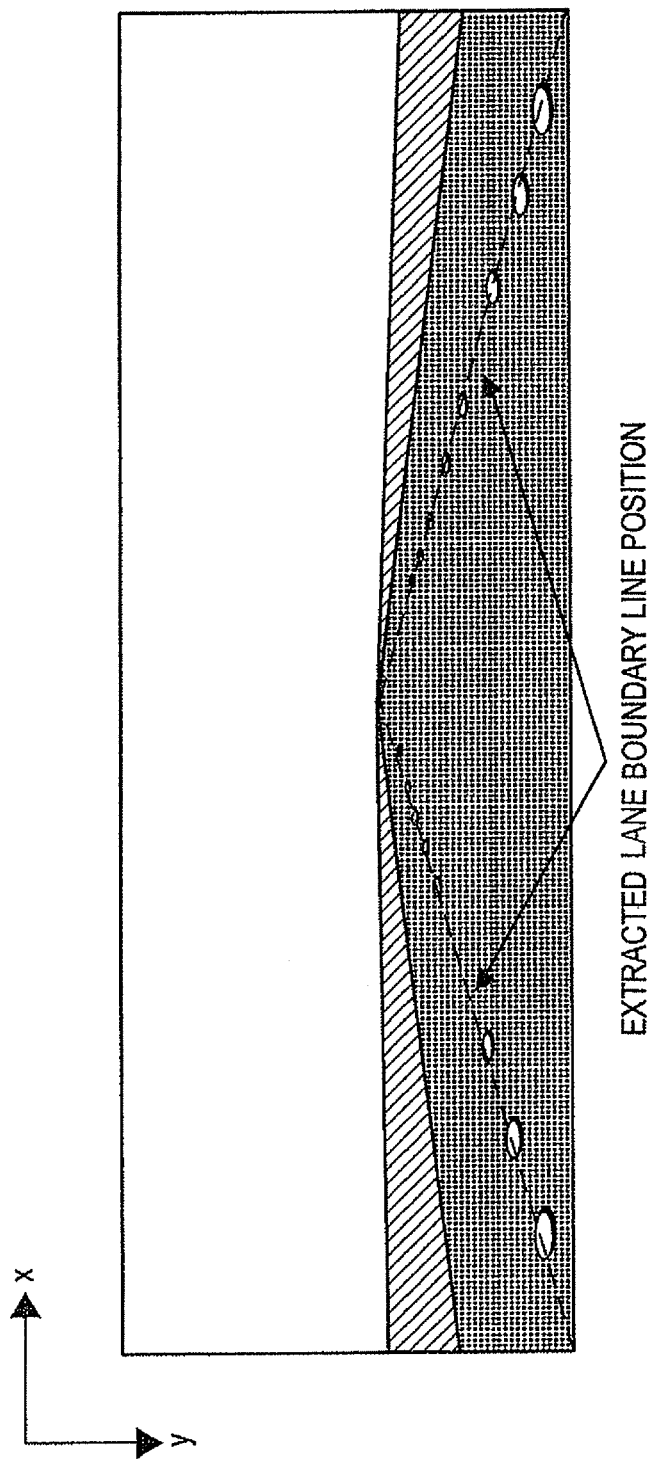
FIG. 12 A view schematically shows an example of a lane boundary line position extracted by a lane boundary discriminant function in the lane recognition device according to the first embodiment of the present invention.

FIGS. 8 to 12 schematically show examples of the results obtained in the above operation according to the first embodiment. In those examples, the lane mark is the stud-shaped lane mark. FIG. 8 is a view schematically showing, as an example of an input image, an image obtained in an imaging device mounted in a vehicle so that a road surface on which the stud-shaped lane marks are provided is located in front of the vehicle. FIG. 8 shows an input image in which stud-shaped lane marks 300 are provided on a road surface 200. FIG. 9 is a view schematically showing a feature image generated from the input image of FIG. 8 by the feature extraction unit 10-2 and a feature point output onto the feature image. FIG. 10 is a view schematically showing a voting feature image generated by voting the feature point of FIG. 9 to the parameter space ($\rho$, $\theta$) in the time-series cumulative voting unit 10-3. FIG. 11 is a view schematically showing a cumulative voting feature image generated by cumulating the voting feature images as shown in FIG. 10, generated for each time, in a time-series manner in the time-series cumulative voting unit 10-3 and a point showing a peak of an output. FIG. 12 is a view schematically showing a lane boundary position, extracted from a peak value of an output in the cumulative voting feature image as shown in FIG. 11 in the lane boundary discrimination unit 10-5, so that the lane boundary position corresponds to the input image.

Second Embodiment

In the above embodiment, although the lane recognition device, method, and program for recognizing the lane boundary expressed by the lane mark have been particularly described, the electronic controller of the lane recognition device may be constituted of only an electronic controller for a stud-shaped lane mark or a combination of the electronic controller for a stud-shaped lane mark and a common electronic controller for a linear lane mark. As the common electronic controller for a linear lane mark, the one described in the Patent Document 1 may be used, for example. Since such a common electronic controller for a linear lane mark is a technique understood by those skilled in the art, the detailed description will be omitted in the present specification.

As an example of case where the electronic controller for a stud-shaped lane mark and the electronic controller for a linear lane mark are required to be combined, there are a case where the stud-shaped lane mark is provided on one of the right and left sides of a lane and the linear lane mark is provided on the other side, a case where each kind of the right and left lane marks is changed by traffic lane change, a case where the stud-shaped lane mark and the linear lane mark overlap on a road, a case where the lane mark is changed from the stud-shaped lane mark to the linear lane mark on a single road, and a case where the linear lane mark is used on a mad in one area where a car is traveling, the stud-shaped lane mark is used on a mad in the other area, and the following recognition unit is selectively used according to an area.

Figure 13:
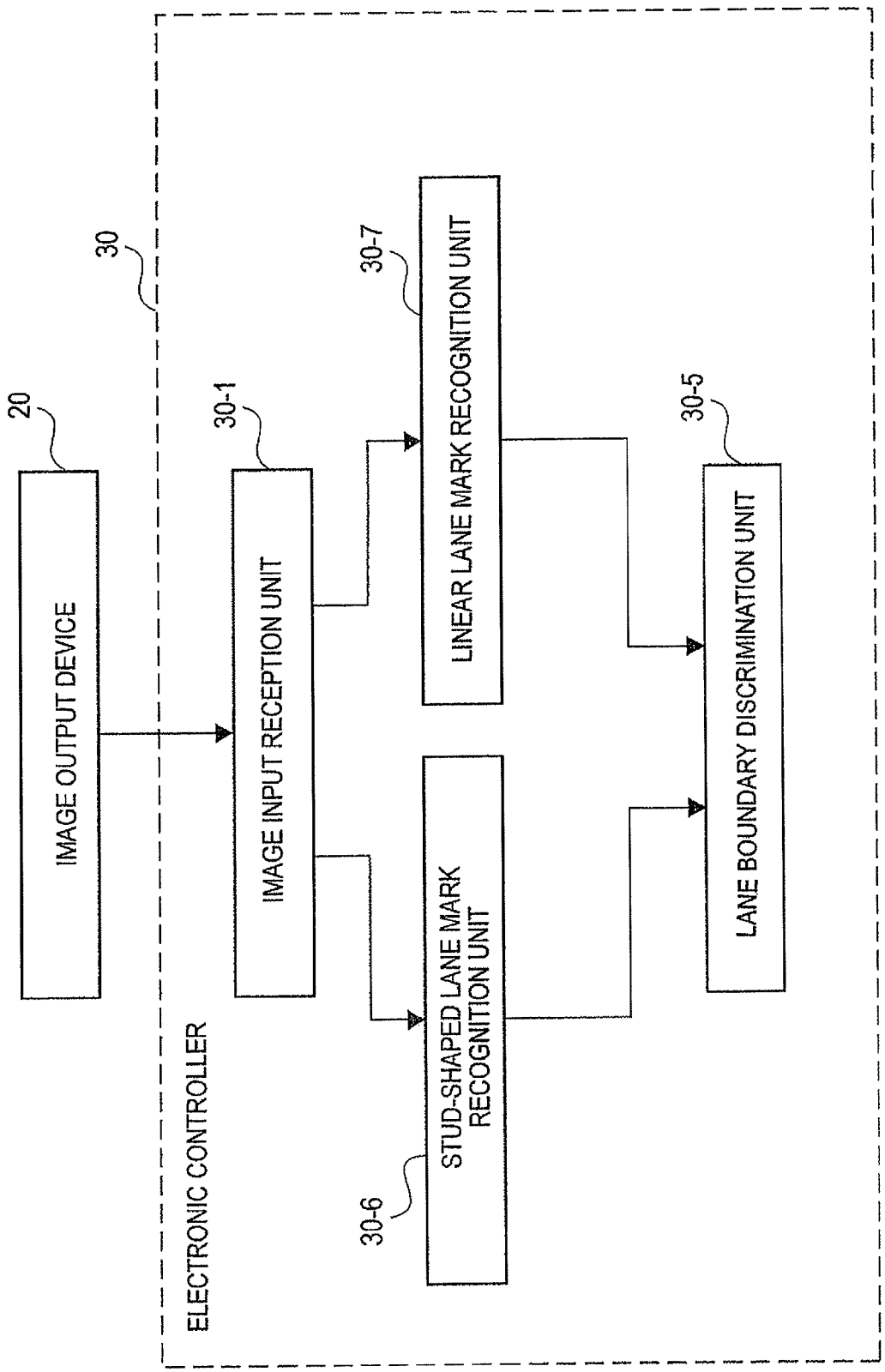
FIG. 13 A block diagram schematically shows a configuration of a lane recognition device according to a second embodiment of the present invention.

As an example of the second embodiment, as shown in FIG. 13, it is considered to realize an electronic controller 30 having a stud-shaped lane mark recognition unit 30-6 and a linear lane mark recognition unit 30-7 provided between an image input reception unit 30-1 and a lane boundary discrimination unit 30-5. The image input reception unit 30-1 has a function similar to the image input reception unit 10-1 of FIG. 2. The lane boundary discrimination unit 30-5 has a function similar to the lane boundary discrimination unit 10-5 of FIG. 2.

As with the lane boundary discrimination unit 30-5 of the first embodiment, the lane boundary discrimination unit 30-5 in the present embodiment extracts a candidate of a lane boundary line position with respect to the respective outputs of the stud-shaped lane mark recognition unit 30-6 and the linear lane mark recognition unit 30-7. Then, the lane boundary discrimination unit 30-5 may perform discrimination similar to the lane boundary discrimination unit 30-5 of the first embodiment without discriminating the candidate of the lane boundary line position according to the respective outputs of the stud-shaped lane mark recognition unit 30-6 and the linear lane mark recognition unit 30-7 or may weight an evaluated value so that the candidate of the lane boundary line position according to either one of the outputs is preferentially selected.

Figure 14:
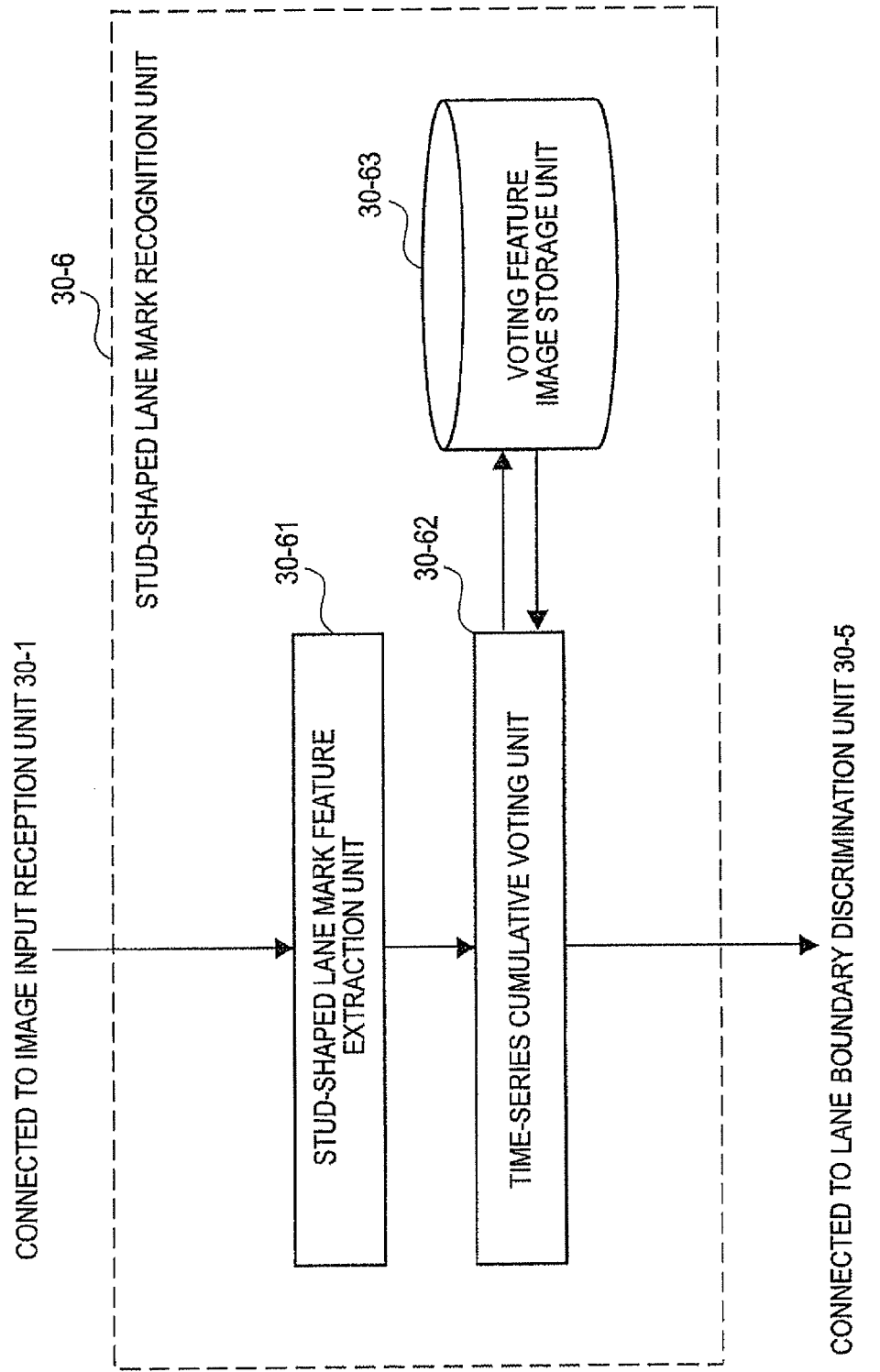
FIG. 14 A block diagram schematically shows a configuration of a stud-shaped lane mark recognition function of the configuration of the lane recognition device according to the second embodiment of the present invention.

Next, the stud-shaped lane mark recognition unit 30-6 will be described with reference to FIG. 14. The stud-shaped lane mark recognition unit 30-6 has a stud-shaped lane mark feature extraction unit 30-61, a time-series cumulative voting unit 30-62, and a voting feature image storage unit 30-63.

The stud-shaped lane mark feature extraction unit 30-61 has a function equal to the function of the feature extraction unit 10-2 of FIG. 2. The time-series cumulative voting unit 30-62 has a function equal to the function of the time-series cumulative voting unit 10-3 of FIG. 2. The voting feature image storage unit 30-63 has a function equal to the function of the voting feature image storage unit 10-4 of FIG. 2.

Figure 15:
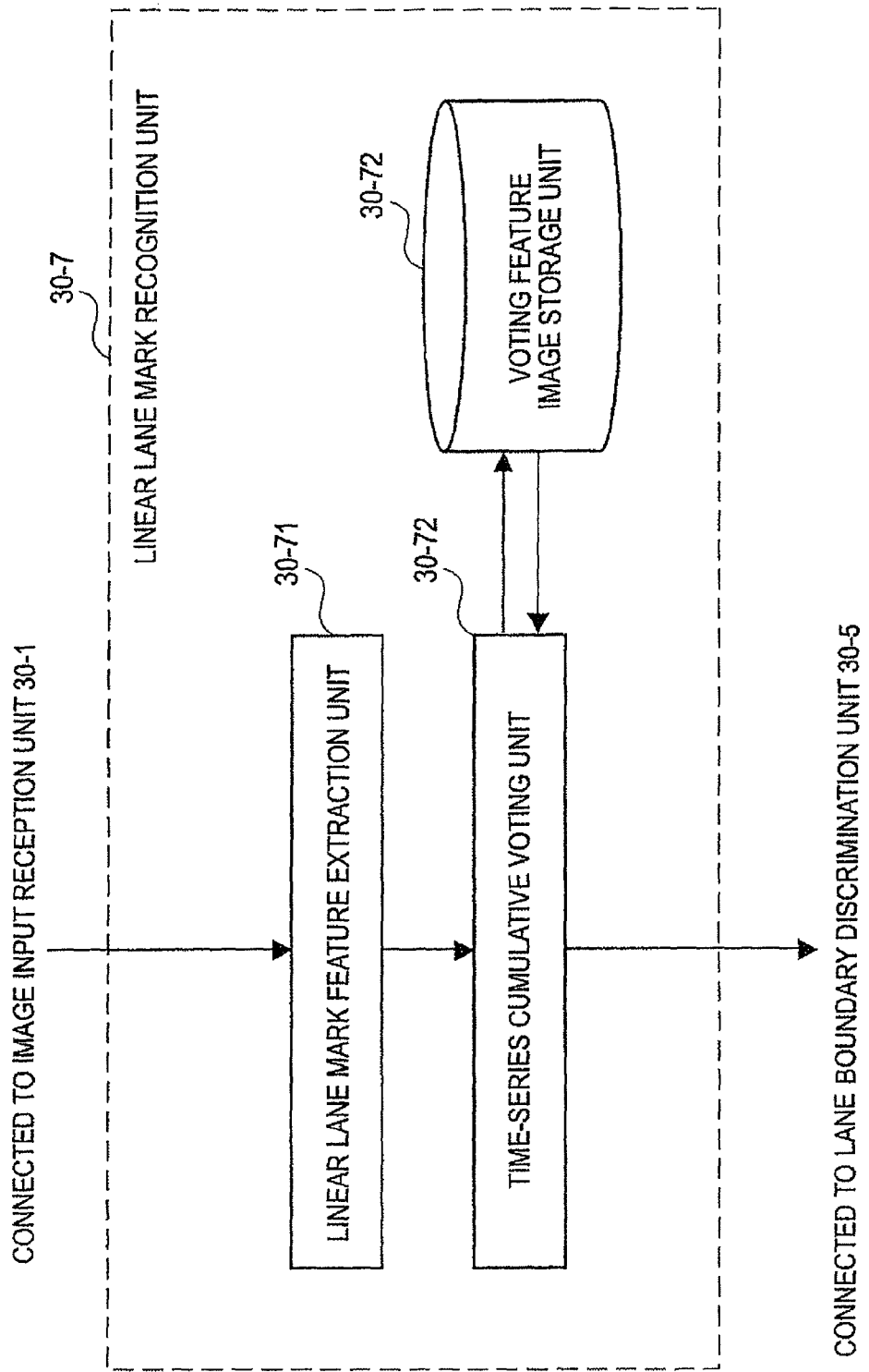
FIG. 15 A block diagram schematically shows a configuration of a linear lane mark recognition function of the configuration of the lane recognition device according to the second embodiment of the present invention.

Next, the linear lane mark 30-7 will be described with reference to FIG. 15. The linear lane mark recognition unit 30-7 has a linear lane mark feature extraction unit 30-71, a time-series cumulative voting unit 30-72, and a voting feature image storage unit 30-73. In the linear lane mark recognition unit 30-7, only the feature extraction function of the stud-shaped lane mark recognition unit 30-6 is replaced with the linear lane mark feature extraction unit 30-71 which extracts a feature of the linear lane mark. As a feature extraction filter of the linear lane mark feature extraction unit 30-71, a gradient feature filter such as Prewitt and Sobel may be used, for example.

The time-series cumulative voting unit 30-72 has a function equal to the function of the time-series cumulative voting unit 10-3 of FIG. 2. The voting feature image storage unit 30-73 has a function equal to the function of the voting feature image storage unit 10-4 of FIG. 2. In FIGS. 14 and 15, although the voting feature image storage units 30-63 and the voting feature image storage unit 30-73 are separately illustrated, they may be realized by one storage device.

According to the above constitution, in the second embodiment, the lane boundary discrimination including the feature of the linear lane mark can be performed.

Third Embodiment

Figure 16:
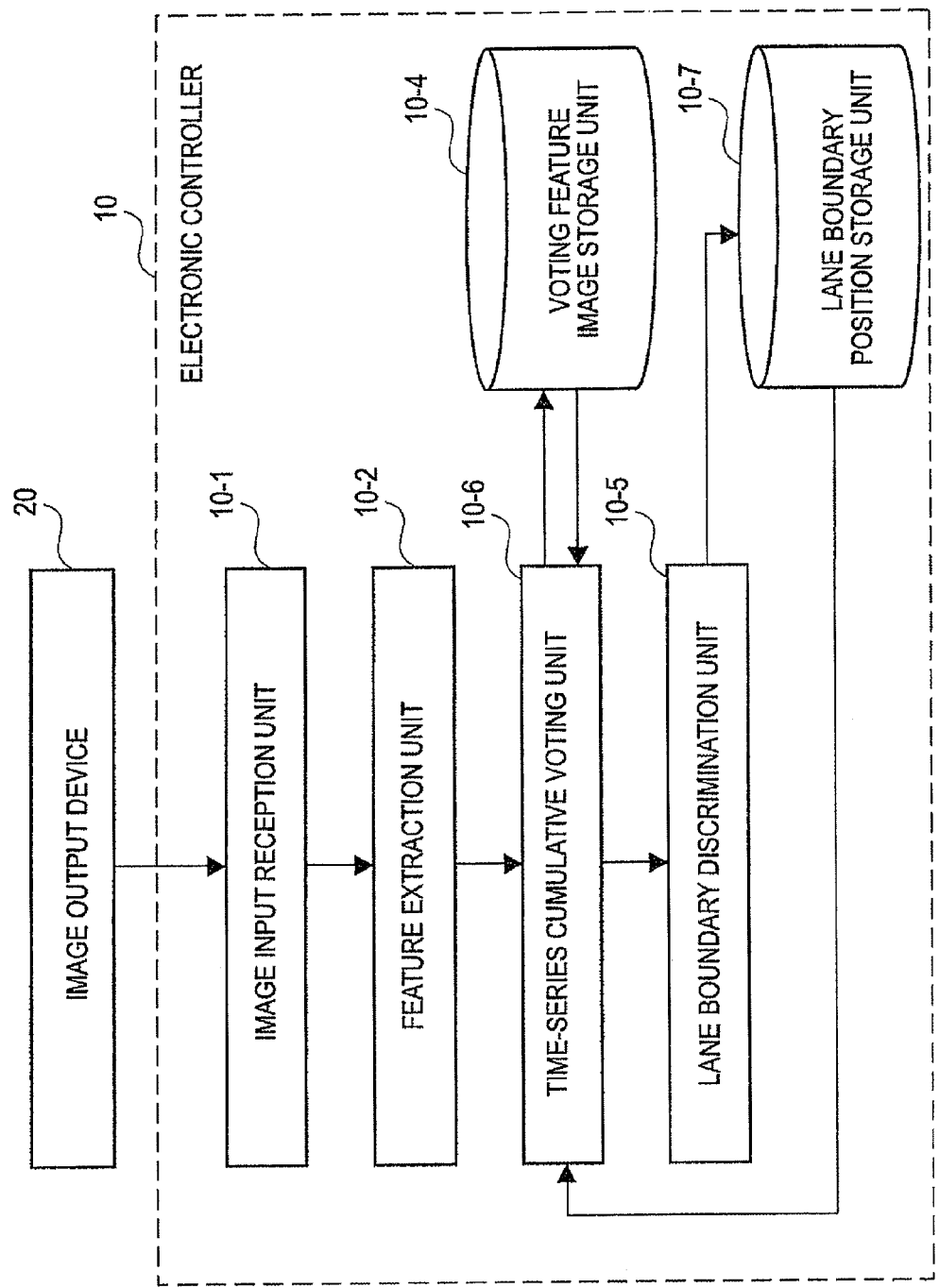
FIG. 16 A block diagram schematically shows a configuration of a lane recognition device according to a third embodiment of the present invention.

Next, a third embodiment of the present invention will be described in detail. In the constitution of the third embodiment (FIG. 16), the lane boundary position storage unit 10-7 is added to the constitution of the first embodiment (FIG. 2).

The third embodiment is constitutionally different from the first embodiment in the presence of the lane boundary position storage unit 10-7 and in that the function of the time-series cumulative voting unit 10-3 is modified to become the time-series cumulative voting unit 10-6. Thus, in the following description, each device and each function of the third embodiment other than the time-series cumulative voting unit 10-6 and the lane boundary position storage unit 10-7 are assigned the same reference numerals as those in the first embodiment. Namely, the image output device 20 of FIG. 16, the image input reception unit 10-1, the feature extraction unit 10-2, the voting feature image storage unit 10-4, and the lane boundary discrimination unit 10-5 have functions similar to each device and each function of the first embodiment.

The lane boundary position storage unit 10-7 added in the third embodiment stores a lane boundary position detected in each frame in a predetermined time-series section and provides the information to the time-series cumulative voting unit 10-6.

The time-series cumulative voting unit 10-6 in the third embodiment estimates transition of a relative lane boundary position (hereinafter suitably referred to as a "lateral position") to a vehicle from a time-series change of the past lane boundary positions stored in the lane boundary position storage unit 10-7. In the time-series cumulative voting unit 10-6 in the third embodiment, correction of the lateral position based on an estimated transition amount (hereinafter suitably referred to as "lateral position correction") is applied to a cumulative voting feature image at the previous time, and thereafter, a vote value at the present time is added and voted as in the first and second embodiments to generate a cumulative voting feature image.

According to the above constitution, in the third embodiment, even when a relative lateral moving speed (hereinafter suitably referred to as "lateral speed") of the lane boundary position to a vehicle cannot be ignored, the lane boundary position can be detected with high accuracy.

Specific examples of the time-series cumulative voting unit 10-6 in the third embodiment will be shown as follows as (third embodiment: example 1) and (third embodiment: example 2).

Third Embodiment

Example 1

In a first specific example of the third embodiment, first of all, the lateral speed is estimated from a time-series change of the past lane boundary positions stored in the lane boundary position storage unit 10-7.

As an example of a method of estimating the lateral speed, there may be used a method of linearly interpolating the relative boundary position (lateral position) with a vehicle in the past predetermined section and approximately obtaining the variation.

Figure 17:
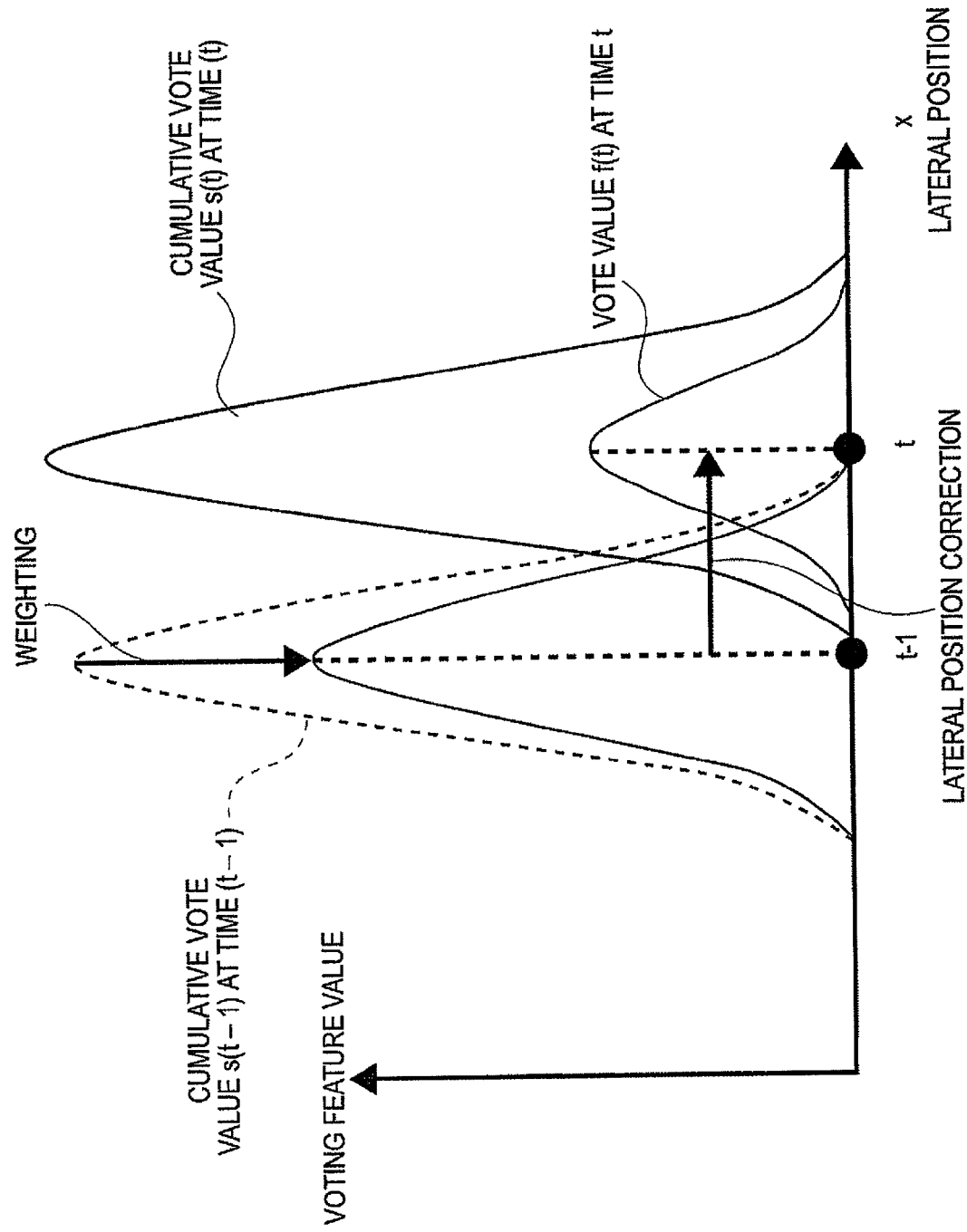
FIG. 17 A conceptual diagram schematically shows an example of the realization of lateral position correction that is one of operation in time-series cumulative voting calculation of operation of an electronic controller in the lane recognition device according to the third embodiment of the present invention.

Next, deviation of the lateral position between time-series arrays occurring when the voting feature images are cumulated is corrected based on the lateral speed estimated value estimated as above. More specifically, the origin of a lateral position coordinate of the past cumulative voting feature image $(s(t-1))$ is moved by the number of pixels corresponding to $-(VL) \times ((t)-(t-1))$, where (VL) is a lateral speed estimated value, and $((t)-(t-1))$ is a difference between the obtained time $(t-1)$ of the past voting feature image used in the generation of the cumulative voting feature image and the present time (t), whereby the voting feature images at the present time can be cumulated. FIG. 17 is a conceptual diagram schematically showing an example of the realization of the lateral position correction.

As a method of realizing the lateral position correction on a program, each pixel value of the past cumulative voting feature image $(s(t-1))$ may be actually moved on a memory space, or the lateral position correction may be realized by changing a pointer variable for referring to a memory region of each pixel.

Figure 18:
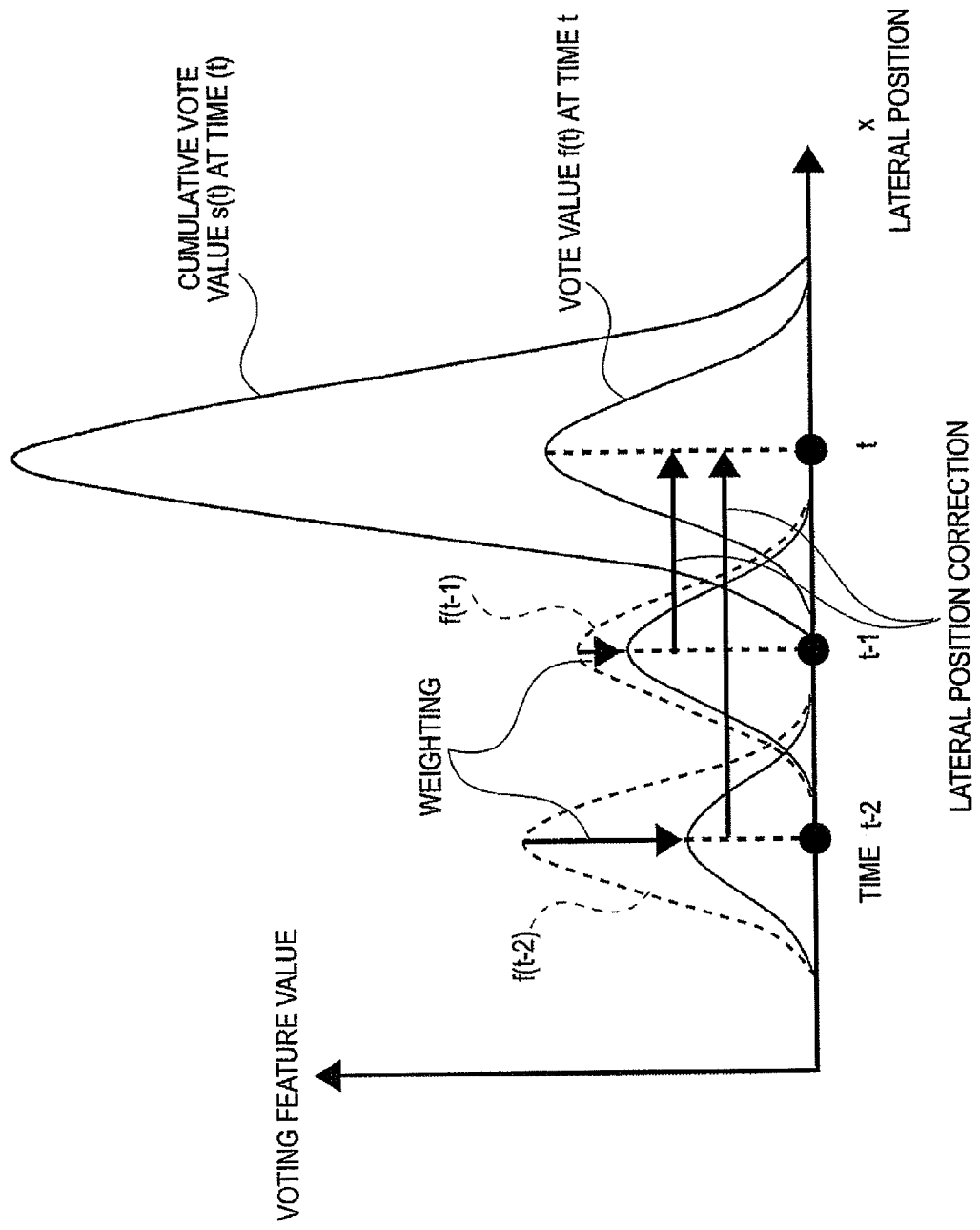
FIG. 18 A conceptual diagram schematically shows an example of the realization of the lateral position correction that is one of the operation in the time-series cumulative voting calculation of the operation of the electronic controller in the lane recognition device according to the third embodiment of the present invention.

In the above description, a case where the lateral position correction is applied to only the cumulative voting feature image $(s(t-1))$ generated at the previous time will be described corresponding to a specific example of the first embodiment (first embodiment: example 2). Meanwhile, a similar processing is corresponded to a specific example of the first embodiment (first embodiment: example 1), and the lateral position correction is applied to the individual voting feature images $(f(t-1), f(t-2), \ldots,$ and $f(t-T))$ obtained at each time in the past predetermined section $((t-T)$ to $(t-1))$, whereby the lateral position correction can be realized. FIG. 18 is a conceptual diagram schematically showing an example of the realization of the lateral position correction corresponding to (first embodiment 1: example 1).

As in the first and second embodiments, after the past voting feature image or the past cumulative feature image is weighted using the forgetting coefficient, the cumulative feature image at the present time can be generated (see, FIGS. 17 and 18).

In addition to the correction of the lateral position coordinate, a distribution function in which uncertainty of an estimated value of the lateral speed is modeled is multiplied in the lateral coordinate direction around the lateral coordinate after movement, whereby an estimated error of the lateral speed can be absorbed. In the distribution function, there can be used Gaussian distribution and trapezoidal distribution in which dispersion is defined by a change of the lateral speed (hereinafter suitably referred to as "lateral acceleration") calculated from the past lateral position, for example. The weighting using the forgetting coefficient similar to the first and second embodiments is included in the coefficient of the distribution function, whereby weighted dispersion processing using the distribution coefficient of an estimated error may be performed.

After the above correction is performed, the vote value at the present time is added and voted to generate the cumulative voting feature image at the present time (t).

Third Embodiment

Example 2

In a second specific example of the third embodiment, first of all, a range that the lateral position can undergo a transition is calculated from the past lane boundary position stored in the linear lane mark feature extraction unit 10-7 and a time-series change of the past lane boundary position. As an example of a specific method, the maximum lateral speed set by the specification of application is assumed, and a transition amount generated from the lateral position at the previous time to the present time may be the transitive range. As another example of a specific method, as in (third embodiment: example 1), estimated lateral speed and Gaussian distribution and trapezoidal distribution set from estimated lateral acceleration are assumed, and a range having a certain probability may be the transitive range.

Next, one of the values within the above range is selected by being assumed as a correct value, and the origin of the lateral position coordinate of the past cumulative voting feature image (s(t−1)) is moved. Thereafter, the voting feature images at the present time are cumulated, and the cumulative voting feature image at the present time is generated (Si(t), i=1, 2, . . . ).

In the above description, to correspond to the specific example of the first embodiment (first embodiment: example 2), the lateral position correction is applied to only the cumulative voting feature image (s(t−1)) generated at the previous time. However, by corresponding a similar processing to the specific example of the first embodiment (first embodiment: example 1), the lateral position correction is individually applied to the voting feature images (f(t−1), f(t−2), . . . , and f(t−T)) obtained at the respective times of the past predetermined section ((t−T) to (t−1), whereby it is possible to realize.

After the past voting feature image or the past cumulative feature image is weighed using the forgetting coefficient as in the first and second embodiments, the cumulative feature image at the present time can be generated.

Next, an evaluated value (value (Si)) showing whether the generated cumulative voting feature image satisfies the expected conditions is calculated and stored. As an example of the method of calculating the evaluated value, the maximum value of the vote value in each generated cumulative voting feature image may be used as the evaluated value. As another specific method, for example, as an average value of dispersion of the peak of a maximum value more than a certain threshold value becomes smaller, a larger evaluated value may be provided.

In the whole range that the lateral position can undergo a transition, (Si(t)) and (value (Si)) are calculated, and the cumulative voting feature image with the highest evaluated value (value (Si)) is employed as the cumulative voting feature image (S(t)) at the present time (t).

Comparing (third embodiment: example 1) and (third embodiment: example 2), although the calculation amount is small in (third embodiment: example 1), correct lane boundary position information in the past predetermined section is required as an initial value for the estimation of the lateral speed.

Meanwhile, although the calculation amount is large in (third embodiment: example 2), the range that the lateral position can undergo a transition is set to the entire domain of the lateral position, whereby the above initial value is not required.

Thus, after a vehicle travels for enough time to generate a time-series cumulative feature space after the start of traveling, the lane boundary position is detected using (third embodiment: example 2) in a certain predetermined time section, and the lane boundary position information with enough number to estimate the lateral speed is obtained.

Then, (third embodiment: example 1) may be used using the time-series information of the lane boundary position as an initial value.

Next, the operation of the third embodiment will be described. The whole operation is similar to that in the first embodiment shown in FIG. 3. Hereinafter, the operations (corresponding to step S300 of FIG. 3) of the time-series cumulative voting unit 10-6 corresponding respectively to (third embodiment: example 1) and ((third embodiment: example 2) will be described as examples.

Figure 19:
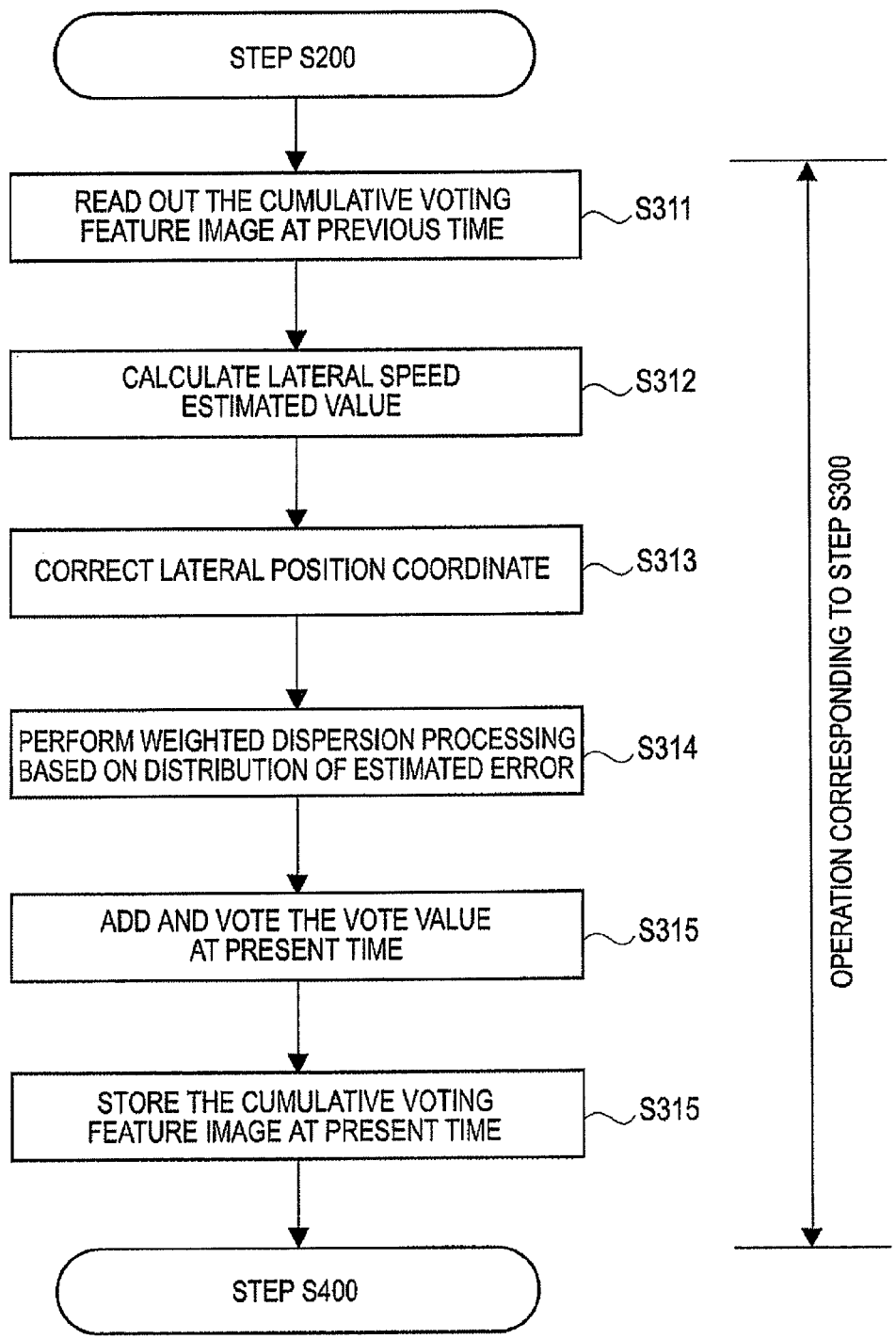
FIG. 19 A flow chart schematically shows a specific example (third embodiment: example 1) in the time-series cumulative voting calculation of the operation of the electronic controller in the lane recognition device according to the third embodiment of the present invention.

As an example of the operation corresponding to (third embodiment: example 1), referring to FIG. 19, in the time-series cumulative voting calculation (corresponding to step S300 of FIG. 3), first of all, the time-series cumulative voting unit 10-6 reads out the cumulative voting feature image generated at the previous time (represented by t−1) from the voting feature image storage unit 10-4 (step S311).

Then, the time-series cumulative voting unit 10-6 calculates the lateral speed estimated value at the present time based on the past lateral position information stored in the lane boundary position storage unit 10-7 (step S312).

Then, the time-series cumulative voting unit 10-6 corrects the lateral position coordinate of the cumulative voting feature image at the previous time based on the lateral speed estimated value (step S313).

Then, the time-series cumulative voting unit 10-6 applies the weighted dispersion processing to the cumulative voting feature image at the previous time in the lateral position coordinate direction based on distribution of an estimated error of the lateral speed (step S314).

Then, the time-series cumulative voting unit 10-6 calculates the vote value to the parameter space with regard to each feature point extracted at the present time (represented by t) (step S315).

Next, the time-series cumulative voting unit 10-6 adds and votes the calculated vote value at the time (t) onto the cumulative voting feature image already corrected and subjected to the weighted dispersion processing (step S316).

Next, the time-series cumulative voting unit 10-6 stores the generated cumulative voting feature image at the time (t) in the voting feature image storage unit 10-4 (step S317).

By virtue of the above operation, the time-series cumulative voting calculation (step S300 of FIG. 3) is realized.

Figure 20:
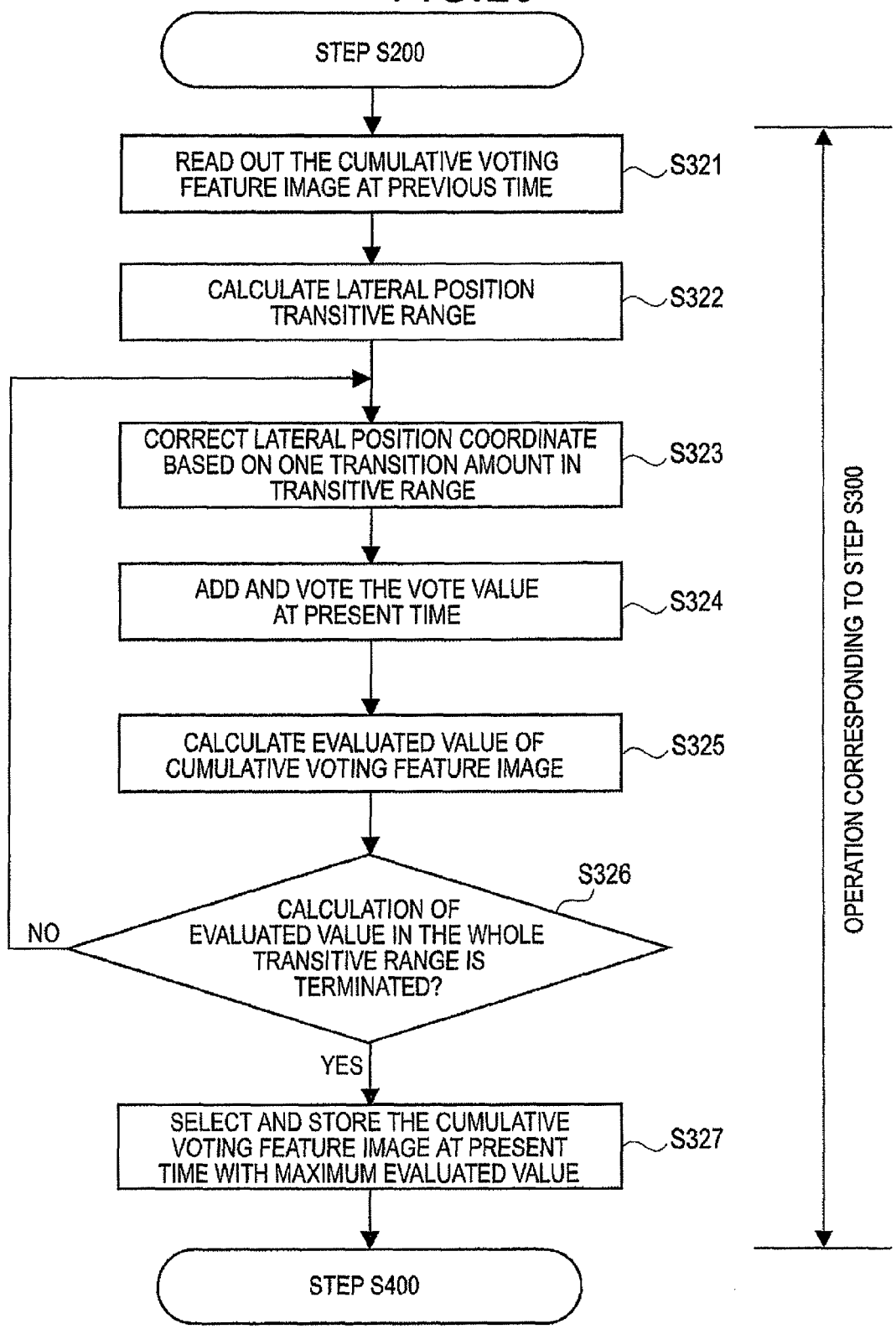
FIG. 20 A flow chart schematically shows a specific example (third embodiment: example 2) of operation of a step of the time-series cumulative voting calculation of the operation of the electronic controller in the lane recognition device according to the third embodiment of the present invention.

Subsequently, as an example of the operation corresponding to (third embodiment 3: example 2), referring to FIG. 20, in the time-series cumulative voting calculation (operation corresponding to step S300 of FIG. 3), first of all, the time-series cumulative voting unit 10-6 reads out the cumulative voting feature image generated at the previous time (represented by t−1) from the voting feature image storage unit 10-4 (step S321).

Then, the time-series cumulative voting unit 10-6 calculates the range that the lateral position can undergo a transition from the previous time (t−1) to the present time (t) based on the past lateral position information stored in the lane boundary position storage unit 10-7 (step S322).

Then, the time-series cumulative voting unit 10-6 selects one lateral position transition amount from the range that the lateral position can undergo a transition and corrects the lateral position coordinate based on the lateral position transition amount (step S323).

Then, the time-series cumulative voting unit 10-6 calculates the vote value to the parameter space with regard to each feature point extracted at the present time (t) (step S324).

Then, the time-series cumulative voting unit 10-6 calculates the evaluated value of the generated cumulative feature image (step S325).

Then, the time-series cumulative voting unit 10-6 confirms whether the generation of the cumulative feature image and the calculation of the evaluated value are performed in the whole transitive range (step S326).

Then, when the generation of the cumulative feature image and the calculation of the evaluated value are performed in the whole transitive range ("Yes" in step S326), the processing proceeds to the next step S327.

Meanwhile, when the generation of the cumulative feature image and the calculation of the evaluated value are not performed yet in the whole transitive range ("Yes" in step S326), the operation from steps S324 to S236 is repeated (S326).

Next, the time-series cumulative voting unit 10-6 selects and stores the cumulative voting feature image with the maximum evaluated value based on the evaluated value calculated in S325 (S327).

By virtue of the above operation, the time-series cumulative voting calculation (step S300 of FIG. 3) is realized.

The first, second, and third embodiments of the present invention provide the following many effects.

As the provided effect, the estimated positions of the lane marks discretely provided are extracted as the feature points from time-series input images according to the feature image, and a straight line (or a curved line) drawn in a time-series manner by the feature points is extracted, whereby the lane boundary line can be extracted from a lane mark image which may not be distinguished from noise by only an image at a certain time.

This is because since noise typically appears at a random position on an image, it is unlikely that a straight line along a vehicle traveling direction is drawn in a time-series manner. Meanwhile a plurality of lane marks are typically provided along a lane boundary line, and when a vehicle travels along a lane, a lane of the lane marks is drawn as a straight line in a time-series manner.

In order to extract the straight line (or a curved line) drawn in a time-series manner by the feature points, when the cumulative voting feature image including the vote values in a plurality of the past times is generated, all the necessary input images in the past time-series section are not required to be stored. More specifically, any one of an array of the feature points at the respective times in the time-series section, an array of the voting feature points in which the feature point at each time is converted on the voting feature image, only the cumulative voting feature image generated at the last time, or only an array of the voting feature points on the cumulative voting feature image generated at the last time may be just stored. Thus, in comparison with the case where the input image (or the feature image) at each time in the time-series section is stored, when only the coordinate of the feature point output as the estimated position of the lane mark and an output are stored as an array, the information of other coordinates is truncated, and therefore, the amount of information to be stored can be reduced. Although the voting feature image is a space constituted of the parameter of the approximate straight line (or approximate curved line) passing through the feature point, the domain can be compressed to the amount of information smaller than the input image (or the feature image) by previously setting the range that can be taken as the relative position between the lane boundary line and a vehicle.

According to the embodiment of the present invention, since the effects can be obtained by storing only the cumulative voting feature image (or the array of the voting feature points) generated at the last time, in comparison with the case of storing the input image (or the feature image) at each time in the time-series section, the size of data to be stored can be significantly reduced.

As described above, since the information amount used in the calculation is reduced, the calculation amount can also be reduced when the same calculation is performed. Accordingly, the lane recognition device having the above effects can be realized with a small calculation amount and a small memory region.

In a general technique as disclosed in the Patent Document 3, in some cases it is difficult to linearly composite the real time-series stud-shaped lane mark images, and thus, there is a disadvantage that it is difficult to extract a linear image feature from the composed image. However, in the embodiments of the present invention, since the feature extraction method assuming that the lane mark image is not linear (continuous) but stud shape (discrete) can be used, a similar disadvantage does not occur.

Further, when the cumulative voting feature image in which the lateral position is corrected is generated as in the third embodiment of the present invention, the detected feature is discrete temporally and spatially as with the stud-shaped lane mark, and even when the relative lateral speed between a vehicle and the lane boundary line position cannot be ignored, the lane boundary position can be detected with high accuracy.

The lane recognition device and the lane recognition method as the embodiments of the present invention are realized by hardware. However, the present invention can be realized by executing a program by a computer. Namely, the present invention relates to a computer, a program, and a computer-readable recording medium recorded with a program. A computer reads a program for functioning the computer as the lane recognition device or the lane recognition method from a computer-readable recording medium and executes the program, whereby the present invention can be realized.

Figure 21:
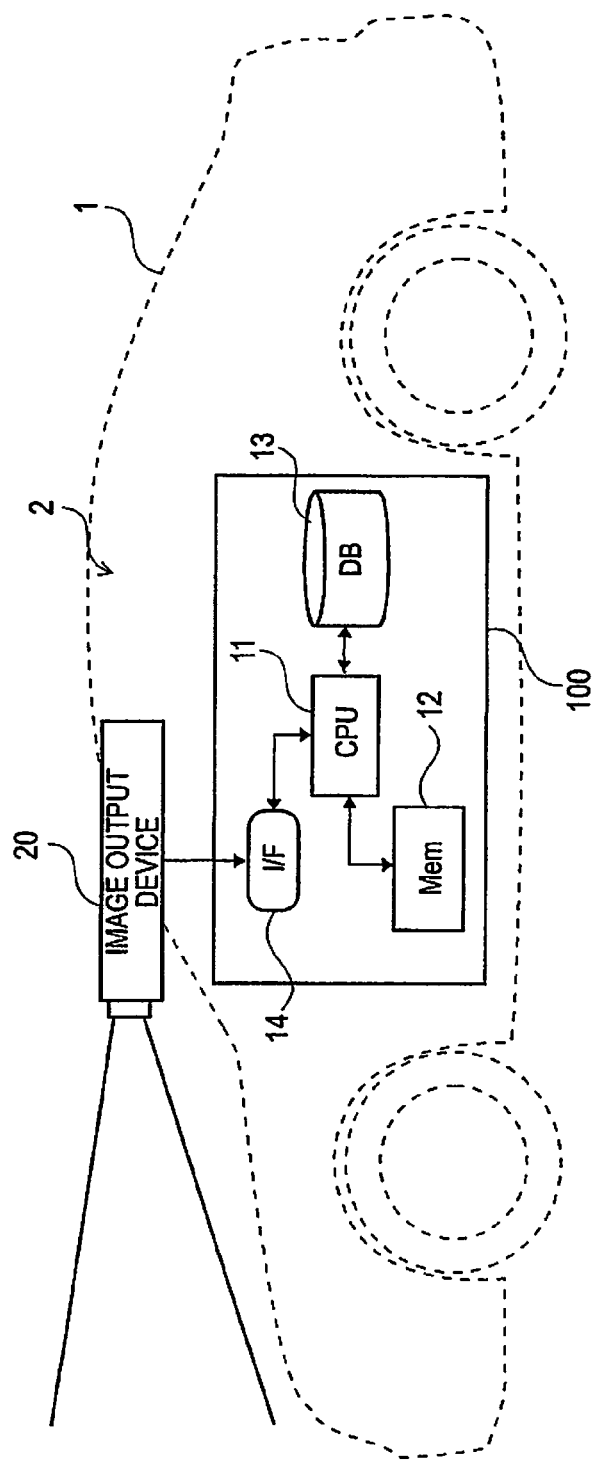
FIG. 21 A view shows a configuration in which functions of the electronic controller is executed by a computer.

As described above, in the above embodiment, the electronic controller 10 is realized by hardware. However, when the present invention is executed by a computer with the use of a program, the computer can perform information processing for recognizing a lane in image information based on a predetermined program and information stored in a database according to the image information from the image output device 20. The "lane" means the lane mark or the lane boundary. FIG. 21 is a view showing a configuration in which the functions of the electronic controller are executed by a computer.

The computer 100 functioning as the electronic controller has a central processing unit 11, a first storage device 12, a second storage device 13, and an interface 14. In the drawing, the central processing unit 11 is referred to as "CPU 11". The first storage device 12 is referred to as "Mem 12". The second storage device 13 is referred to as "DB 13". The interface 14 is referred to as "I/F 14".

In FIG. 1, although the first storage device 12 and the second storage device 13 are separately illustrated as a matter of convenience, they may be realized as one storage device.

The interface 14 is a device which intermediates the exchange of information between the central processing unit 11 and the image output device 20.

The first storage device 12 is a device which stores temporary data and is electrically connected to the central processing unit 11.

The second storage device 13 is a device which mainly stores database and is electrically connected to the central processing unit 11. Although the first storage device 12 and the second storage device 13 are incorporated in a computer 100 in FIG. 21, they may be mounted as external storage devices.

The central processing unit 11 is a device which performs information processing and is electrically connected to the interface 14, the first storage device 12, and the second storage device 13. The central processing unit 11 executes a program to perform the information processing for recognizing a lane by suitably referring to the information stored in the first storage device 12 and the second storage device 13 based on the image information input from the image output device 20 through the interface 14.

The computer 100 executes a software program in the central processing unit 11 and thereby can realize various functions as shown in FIG. 2.

The whole or part of the exemplary embodiments above can be described as the following supplementary notes, but are not limited thereto.

(Supplementary Note 1)

A lane recognition device comprising: a feature extraction unit which extracts a candidate position of a lane mark from a received input image; a cumulative voting unit which weights a vote value according to the elapsed time with regard to the extracted candidate position and cumulatively performs voting to a parameter space of an approximate curved line or an approximate straight line, to generate a cumulative voting feature image; and a lane boundary discrimination unit which extracts a candidate of a lane boundary line position based on the generated cumulative voting feature image to determine the lane boundary line position.

(Supplementary Note 2)

The lane recognition device according to supplementary note 1, wherein the cumulative voting unit uses Hough conversion in the voting.

(Supplementary Note 3)

The lane recognition device according to supplementary note 1 or 2, wherein the cumulative voting unit adds the voting according to the candidate position extracted at the present time to a voting feature image in which all values on the cumulative voting feature image generated at a previous time are weighted by using a coefficient of not less than zero and not more than one that means a forgetting effect according to the elapsed time and thereby generates the cumulative voting feature image at the present time.

(Supplementary Note 4)

The lane recognition device according any one of supplementary note 1 to 3, wherein the feature extraction unit comprises a first feature extraction unit which extracts a candidate position of a stud-shaped lane mark from the received input image, the cumulative voting unit comprises a first cumulative voting unit which generates the cumulative voting feature image for the stud-shaped lane mark with regard to the candidate position of the extracted stud-shaped lane mark, and the lane boundary discrimination unit extracts a candidate of the lane boundary line position based on the cumulative voting feature image for the stud-shaped lane mark to determine the lane boundary line position.

(Supplementary Note 5)

The lane recognition device according to any one of supplementary notes 1 to 3, wherein the feature extraction unit comprises a second feature extraction unit which extracts a candidate position of a linear lane mark from the received input image, the cumulative voting unit comprises a second cumulative voting unit which generates the cumulative voting feature image for the linear lane mark with regard to the candidate position of the extracted linear lane mark, and the lane boundary discrimination unit extracts a candidate of the lane boundary line position based on the cumulative voting feature image for the linear lane mark to determine the lane boundary line position.

(Supplementary Note 6)

The lane recognition device according to any one of supplementary notes 1 to 5, wherein the cumulative voting unit estimates the lateral speed at the present time based on information of a time-series change of a lane boundary position detected in the past, corrects deviation to the lateral position at the present time based on the estimated lateral speed value so that any voting feature image of the voting feature image in the past predetermined section and the cumulative voting feature image at a previous time of the present time is an object to be corrected, cumulates a voting feature value at the present time on the corrected voting feature image, and thereby generates the cumulative voting feature image at the present time.

(Supplementary Note 7)

The lane recognition device according to supplementary note 6, wherein the cumulative voting unit estimates a section where the lateral position at the present time can exist based on information of a time-series change of a lane boundary position detected in the past, generates a cumulative voting feature image at the present time based on all the estimated lateral positions in the section, and adopts, as the cumulative voting feature image at the present time, the most suitable cumulative voting feature image of the generated cumulative voting feature images.

(Supplementary Note 8)

A vehicle comprising the lane recognition device according to any one of supplementary notes 1 to 7, wherein the lane recognition device comprises an image output device which images an image and outputs the imaged image, and the input image received by the feature extraction unit is the image output from the image output device.

(Supplementary Note 9)

A lane recognition method comprising:
extracting a candidate position of a lane mark from a received input image;
weighting a vote value according to the elapsed time with regard to the extracted candidate position and cumulatively performing voting to a parameter space of an approximate curved line or an approximate straight line, to generate a cumulative voting feature image, and
extracting a candidate of a lane boundary line position based on the generated cumulative voting feature image to determine the lane boundary line position.

(Supplementary Note 10)

The lane recognition method according to the supplementary note 9, wherein Hough conversion is used in the voting.

(Supplementary Note 11)

The lane recognition method according to the supplementary note 9 or 10, wherein when the voting is performed, the voting according to the candidate position extracted at the present time is added to a voting feature image in which all values on the cumulative voting feature image generated at a previous time are weighted by using a coefficient of not less than zero and not more than one that means a forgetting effect according to the elapsed time, whereby the cumulative voting feature image at the present time is generated.

(Supplementary Note 12)

The lane recognition method according to any one of the supplementary notes 9 to 11, wherein the candidate position of the stud-shaped lane mark is extracted from the received input image, the cumulative voting feature image for the stud-shaped lane mark is generated with regard to the candidate position of the extracted stud-shaped lane mark, and when the lane boundary determination is performed, a candidate of the lane boundary line position is extracted based on a cumulative voting feature image for the stud-shaped lane mark, whereby the lane boundary line position is determined.

(Supplementary Note 13)

The lane recognition method according to any one of the supplementary notes 9 to 11, wherein a candidate position of the linear lane mark is extracted from the received input image, the cumulative voting feature image for the linear lane mark is generated with regard to the candidate position of the extracted linear lane mark, and when the lane boundary determination is performed, a candidate of the lane boundary line position is extracted based on a cumulative voting feature image for the linear lane mark, whereby the lane boundary line position is determined.

(Supplementary Note 14)

The lane recognition method according to any one of the supplementary notes 9 to 13, the lateral speed at the present time is estimated based on information of a time-series change of a lane boundary position detected in the past, deviation to the lateral position at the present time is corrected based on the estimated lateral speed value so that any voting feature image of the voting feature image in the past predetermined section and the cumulative voting feature image at a previous time of the present time is an object to be corrected, and a voting feature value at the present time is cumulated on the corrected voting feature image, whereby the cumulative voting feature image at the present time is generated.

(Supplementary Note 15)

The lane recognition method according to the supplementary note 14, a section where the lateral position at the present time can exist is estimated based on information of a time-series change of the lane boundary position detected in the past, the cumulative voting feature image at the present time based on all estimated lateral positions in the section is generated, and the optimum cumulative voting feature image at the present time is selected from the generated cumulative voting feature images.

(Supplementary Note 16)

A lane recognition program causing a computer to realize a feature extraction function that extracts a candidate position of a lane mark from a received input image, a cumulative voting function that weights a vote value according to the elapsed time with regard to the candidate position extracted by the feature extraction function to cumulatively perform voting to a parameter space of an approximate curved line or an approximate straight line, and, thus, to generate a cumulative voting feature image, and a lane boundary determination function that extracts a candidate of a lane boundary line position based on the generated cumulative voting feature image to determine the lane boundary line position.

(Supplementary Note 17)

The lane recognition program according to the supplementary note 16, wherein the time-series cumulative voting function uses Hough conversion in the voting.

(Supplementary Note 18)

The lane recognition program according to the supplementary note 16 or 17, wherein the cumulative voting function adds the voting according to the candidate position extracted at the present time to a voting feature image in which all values on the cumulative voting feature image generated at a previous time are weighted by using a coefficient of not less than zero and not more than that means a forgetting effect according to the elapsed time, whereby the cumulative voting feature image at the present time is generated.

(Supplementary Note 19)

The lane recognition program according to any one of the supplementary notes 16 to 18, wherein a feature extraction function comprises a first feature extraction function that extracts the candidate position of a stud-shaped lane mark from the received input image, the cumulative voting function includes a first cumulative voting function that generates the cumulative voting feature image for the stud-shaped lane mark with regard to the candidate position of the extracted stud-shaped lane mark, and the lane boundary determination function extracts a candidate of the lane boundary line position based on the cumulative voting feature image for the stud-shaped lane mark to determine the lane boundary line position.

(Supplementary Note 20)

The lane recognition program according to any one of the supplementary notes 16 to 18, the feature extraction function comprises a second feature extraction function that extracts a candidate position of a linear lane mark from the received input image, the cumulative voting function includes a second cumulative voting function that generates the cumulative voting feature image for the linear lane mark with regard to the candidate position of the extracted linear lane mark, and the lane boundary determination function extracts a candidate of the lane boundary line position based on the cumulative voting feature image for the linear lane mark to determine the lane boundary line position.

(Supplementary Note 21)

The tract recognition program according to any one of the spplementary notes 16 to 20, the cumulative voting function estimates the lateral speed at the present time based on information of a time-series change of the lane boundary position detected in the past to correct deviation to the lateral position at the present time based on the estimated lateral speed value so that any voting feature image of the voting feature image in the past predetermined section and the cumulative voting feature image at a previous time of the present time is an object to be corrected, and, thus, to cumulate the voting feature value at the present time on the corrected voting feature image, whereby the cumulative voting feature image at the present time is generated.

(Supplementary Note 22)

The lane recognition program according to the supplementary note 21, the cumulative voting function estimates a section where the lateral position at the present time can exist is estimated based on information of a time-series change of the lane boundary position detected in the past, generates the cumulative voting feature image at the present time based on all estimated lateral positions in the section, and selects the optimum cumulative voting feature image at the present time from the generated cumulative voting feature images.

Although the above embodiments are preferred ones of the present invention, the range of the present invention is not limited to only the above embodiments, and the present invention can be variously modified and practiced without departing from the scope of the present invention. Accordingly, the above embodiments are just examples and should not be construed in a limited way. The range of the present invention is shown by the scope of claims and is not constrained by the description of the specification and the abstract. Further, all of variation and modification belonging to the equivalent range of the claims are within the range of the present invention.

The present application claims priority based on Japanese Patent Application No. 2009-267421 filed on Nov. 25, 2009 and Japanese Patent Application No. 2010-071931 filed on Mar. 26, 2010. All the contents disclosed in Japanese Patent Applications Nos. 2009-267421 and 2010-071931 are incorporated into the specification of the present application.

REFERENCE SIGNS LIST

1 Vehicle
2 Lane recognition device
10, 30 Electronic controller
10-1, 30-1 Image input reception unit
10-2 Feature extraction unit
10-3, 10-6, 30-62, 30-72 Time-series cumulative voting unit
10-4, 30-63, 30-72 Voting feature image storage unit
10-5, 30-5 Lane boundary discrimination unit
10-7 Lane boundary position storage unit
11 Central processing unit
12 First storage device
13 Second storage device
14 Interface
20 Image output device
30-6 Stud-shaped lane mark recognition unit
30-61 Stud-shaped lane mark feature extraction unit
30-7 Linear lane mark recognition unit
30-71 Linear lane mark feature storage unit

The invention claimed is:

1. A lane recognition device comprising:
a feature extraction electronic circuit configured to extract a plurality of candidate positions of a lane mark from each of a plurality of input images which are received in a time-series manner;
a cumulative voting electronic circuit configured to weight a vote value according to an elapsed time from a time at which each of the plurality of candidate positions has been extracted to the present time, and to cumulatively vote to a parameter space of an approximate curved line or an approximate straight line, to generate a cumulative voting feature image, the approximate curved line or approximate straight line being estimated from each candidate position, the cumulative voting feature image being a set of a plurality of cumulative vote values on the parameter space; and
a lane boundary discrimination electronic circuit configured to extract a candidate of a lane boundary line position based on the cumulative voting feature image to determine the lane boundary line position.

2. The lane recognition device according to claim 1, wherein the cumulative voting electronic circuit uses Hough conversion in the voting.

3. The lane recognition device according to claim 1, wherein the cumulative voting electronic circuit adds the voting according to the candidate position extracted at the present time to a voting feature image in which all values on the cumulative voting feature image generated at a previous time are weighted by using a coefficient of not less than zero and not more than one that means a forgetting effect according to the elapsed time and thereby generates the cumulative voting feature image at the present time.

4. The lane recognition device according claim 1, wherein the feature extraction electronic circuit comprises a first feature extraction electronic circuit configured to extract a candidate position of a stud-shaped lane mark from the received input image, the cumulative voting electronic circuit comprises a first cumulative voting electronic circuit configured to generate the cumulative voting feature image for the stud-shaped lane mark with regard to the candidate position of the extracted stud-shaped lane mark, and the lane boundary discrimination electronic circuit is configured to extract a candidate of the lane boundary line position based on the cumulative voting feature image for the stud-shaped lane mark to determine the lane boundary line position.

5. The lane recognition device according to claim 1, wherein the feature extraction electronic circuit comprises a second feature extraction electronic circuit configured to extract a candidate position of a linear lane mark from the received input image, the cumulative voting electronic circuit comprises a second cumulative voting electronic circuit configured to generate the cumulative voting feature image for the linear lane mark with regard to the candidate position of the extracted linear lane mark, and the lane boundary discrimination electronic circuit is configured to extract a candidate of the lane boundary line position based on the cumulative voting feature image for the linear lane mark to determine the lane boundary line position.

6. The lane recognition device according to claim 1, wherein the cumulative voting electronic circuit is configured to estimate the lateral speed at the present time based on information of a time-series change of a lane boundary position detected in the past, to correct deviation to the lateral position at the present time based on the estimated lateral speed value so that any voting feature image of the voting feature image in the past predetermined section and the cumulative voting feature image at a previous time of the present time is an object to be corrected, to cumulate a voting feature value at the present time on the corrected voting feature image, and to thereby generate the cumulative voting feature image at the present time.

7. The lane recognition device according to claim 6, wherein the cumulative voting electronic circuit is configured to estimate a section where the lateral position at the present time can exist based on information of a time-series change of a lane boundary position detected in the past, to generate a cumulative voting feature image at the present time based on all the estimated lateral positions in the section, the cumulative voting feature image at the present time including a vote value as a cumulative vote result, and to determine a candidate of the cumulative voting feature image at the present time from the cumulative voting feature images based on the vote value.

8. The lane recognition device according to claim 7, wherein the cumulative voting electronic circuit is configured to adopt, as a candidate of the cumulative voting feature image at the present time, the cumulative voting feature image including the maximum cumulative vote value from the cumulative voting feature images.

9. A vehicle comprising the lane recognition device according to claim 1, wherein the lane recognition device comprises an image output device configured to image an image and to output the imaged image, and the input image received by the feature extraction electronic circuit is the image output from the image output device.

10. A lane recognition method comprising:
extracting a candidate position of a lane mark from a received input image;
weighting a vote value according to the elapsed time with regard to the extracted candidate position and cumulatively performing voting to a parameter space of an approximate curved line or an approximate straight line, to generate a cumulative voting feature image, and
extracting a candidate of a lane boundary line position based on the generated cumulative voting feature image to determine the lane boundary line position.

11. The lane recognition method according to claim 10, wherein Hough conversion is used in the voting.

12. The lane recognition method according to claim 10, wherein when the voting is performed, the voting according to the candidate position extracted at the present time is added to a voting feature image in which all values on the cumulative voting feature image generated at a previous time are weighted by using a coefficient of not less than zero and not more than one that means a forgetting effect according to the elapsed time, whereby the cumulative voting feature image at the present time is generated.

13. The lane recognition method according to claim 10, wherein a candidate position of the stud-shaped lane mark is extracted from the received input image, the cumulative voting feature image for the stud-shaped lane mark is generated with regard to the candidate position of the extracted stud-shaped lane mark, and when the lane boundary determination is performed, a candidate of the lane boundary line position is extracted based on a cumulative voting feature image for the stud-shaped lane mark, whereby the lane boundary line position is determined.

14. The lane recognition method according to claim 10, wherein a candidate position of the linear lane mark is extracted from the received input image, the cumulative voting feature image for the linear lane mark is generated with regard to the candidate position of the extracted linear lane mark, and when the lane boundary determination is performed, a candidate of the lane boundary line position is extracted based on a cumulative voting feature image for the linear lane mark, whereby the lane boundary line position is determined.

15. The lane recognition method according to claim 10, wherein the lateral speed at the present time is estimated based on information of a time-series change of a lane boundary position detected in the past, deviation to the lateral position at the present time is corrected based on the estimated lateral speed value so that any voting feature image of the voting feature image in the past predetermined section and the cumulative voting feature image at a previous time of the present time is an object to be corrected, and a voting feature value at the present time is cumulated on the corrected voting feature image, whereby the cumulative voting feature image at the present time is generated.

16. The lane recognition method according to claim 15, wherein a section where the lateral position at the present time can exist is estimated based on information of a time-series change of the lane boundary position detected in the past, the cumulative voting feature image at the present time based on all estimated lateral positions in the section is generated, and the optimum cumulative voting feature image at the present time is selected from the generated cumulative voting feature images.

* * * * *

UNITED STATES PATENT AND TRADEMARK OFFICE
CERTIFICATE OF CORRECTION

PATENT NO. : 8,867,845 B2  
APPLICATION NO. : 13/511875  
DATED : October 21, 2014  
INVENTOR(S) : Kosuke Yoshimi Page 1 of 1

It is certified that error appears in the above-identified patent and that said Letters Patent is hereby corrected as shown below:

In the Specification

Column 1, Line 25: Delete "mad" and insert -- road --

Column 1, Line 31: Delete "mad" and insert -- road --

Column 5, Line 6: Delete "mad" and insert -- road --

Column 8, Line 12: Delete " $s(\rho,\theta,t)=\alpha 0*f(\rho,\theta,t)+\alpha 1*f(\rho,\theta,t-1)+\alpha 2*f(\rho,\Theta,t-2)+ \ldots +\alpha T*f(\rho,\theta,t-T)$ " and insert -- $s(\rho,\theta,t)=\alpha 0*f(\rho,\theta,t)+\alpha 1*f(\rho,\theta,t-1)+\alpha 2*f(\rho,\theta,t-2)+ \ldots +\alpha T*f(\rho,\theta,t-T)$ --

Column 12, Line 13: Delete "mad" and insert -- road --

Column 12, Line 15: Delete "mad" and insert -- road --

Signed and Sealed this  
Twenty-fourth Day of March, 2015

Michelle K. Lee  
*Director of the United States Patent and Trademark Office*